United States Patent
Ferdinand et al.

(10) Patent No.: US 11,108,607 B2
(45) Date of Patent: Aug. 31, 2021

(54) SYSTEM AND METHOD FOR TRANSMITTING AND RECEIVING SINGLE-CARRIER OQAM SYMBOLS WITH NON-NYQUIST TRANSMIT PULSE SHAPING

(71) Applicants: Nuwan Suresh Ferdinand, Stittsville (CA); Ming Jia, Ottawa (CA); Jianglei Ma, Ottawa (CA)

(72) Inventors: Nuwan Suresh Ferdinand, Stittsville (CA); Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/585,553

(22) Filed: Sep. 27, 2019

(65) Prior Publication Data

US 2021/0099330 A1     Apr. 1, 2021

(51) Int. Cl.
*H04L 27/26*     (2006.01)
*H04L 25/03*     (2006.01)

(52) U.S. Cl.
CPC .... *H04L 27/2621* (2013.01); *H04L 25/03834* (2013.01); *H04L 27/2698* (2013.01)

(58) Field of Classification Search
CPC ............. H04L 27/2614; H04L 27/2621; H04L 25/03834; H04L 27/2698; H04L 5/0007; H04L 27/3411
See application file for complete search history.

(56) References Cited

U.S. PATENT DOCUMENTS

| | | | |
|---|---|---|---|
| 2017/0134203 A1* | 5/2017 | Zhu | H04L 27/264 |
| 2018/0198668 A1* | 7/2018 | Kim | H04L 27/2614 |
| 2018/0324005 A1 | 11/2018 | Kim et al. | |

(Continued)

FOREIGN PATENT DOCUMENTS

| | | |
|---|---|---|
| CN | 109428846 A | 3/2019 |
| WO | 2018184174 A1 | 10/2018 |

OTHER PUBLICATIONS

R1-050702 "DFT-Spread OFDM with Pulse Shaping Filter in Frequency Domain in Evolved UTRA Uplink" London, UK, Aug. 29-Sep. 2, 2005.*

(Continued)

*Primary Examiner* — Sophia Vlahos

(57) ABSTRACT

A system and method are provided for processing symbols for transmission. A set of 2K outputs is produced that includes K real components and K imaginary components from K complex symbols. A Fourier transform operation on the 2K outputs produces 2K Fourier transform outputs. Transmit pulse shaping is applied to the 2K Fourier transform outputs. The transmit pulse shape may be Nyquist or non-Nyquist. An inverse Fourier transform operation on the J pulse shaped outputs produces an inverse Fourier transform output. In the receiver, equalization is performed to remove the effect of both the channel and the transmit pulse shape. Nyquist pulse shaping is performed by applying a Nyquist pulse shape prior to converting back to time domain. The approach avoids self-interference, even in situations where the transmit pulse shape is non-Nyquist. The transmitter is free to select a pulse shape to optimize PAPR without being concerned with interference.

12 Claims, 15 Drawing Sheets

(56) References Cited

U.S. PATENT DOCUMENTS

2019/0158339 A1   5/2019  Park et al.
2021/0075661 A1   3/2021  Ferdinand et al.

OTHER PUBLICATIONS

Discussion on further PAPR reduction for uplink DFT-S-OFDM, 3GPP TSG RAN WG1 NR Ad Hoc Meeting, R1-1700077, Spokane, USA, Jan. 16-20, 2017.
Performance evaluation for pi/2 BPSK with FDSS, 3GPP TSG RAN WG1 Meeting #88bis, R1-1705060, Spokane, USA, Apr. 3-7, 2017.
On transparency of spectrum shaping for π/2-BPSK DFT-s-OFDM, 3GPP TSG RAN WG1 Meeting #90, R1-1714488, Prague, Czechia Aug. 21-25, 2017.
Huawei et al,"Discussion on further PAPR reduction for DFT-S-OFDM", 3GPP TSG RAN WG1 #88, R1-1701725, Athens, Greece, Feb. 13-17, 2017, total 6 pages.

* cited by examiner

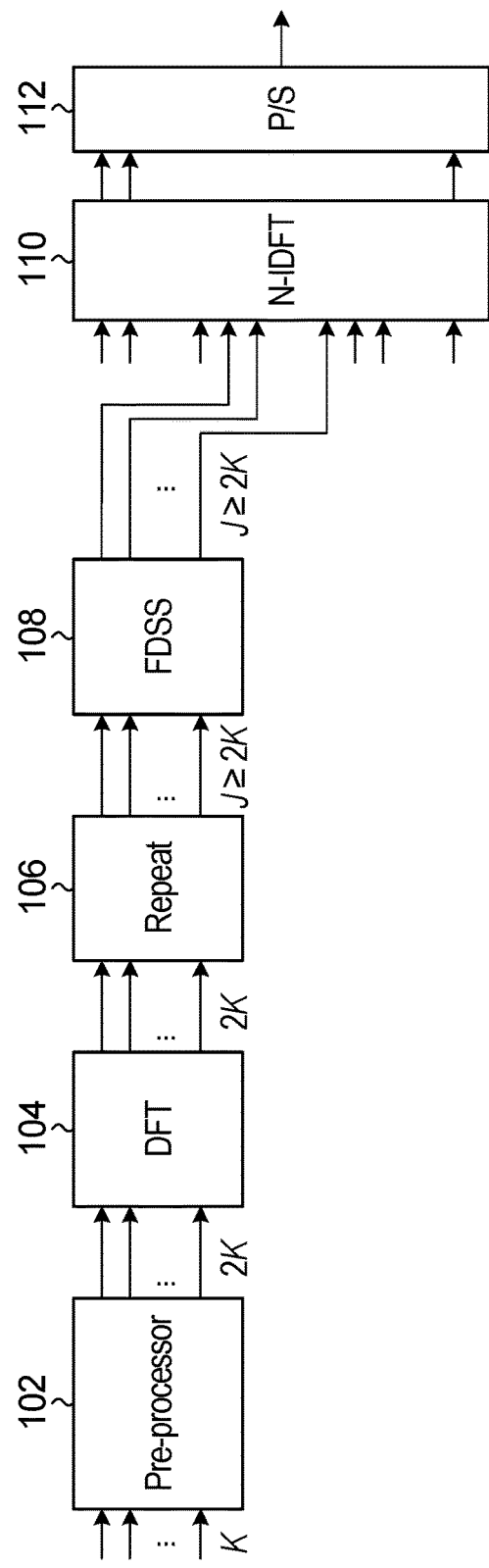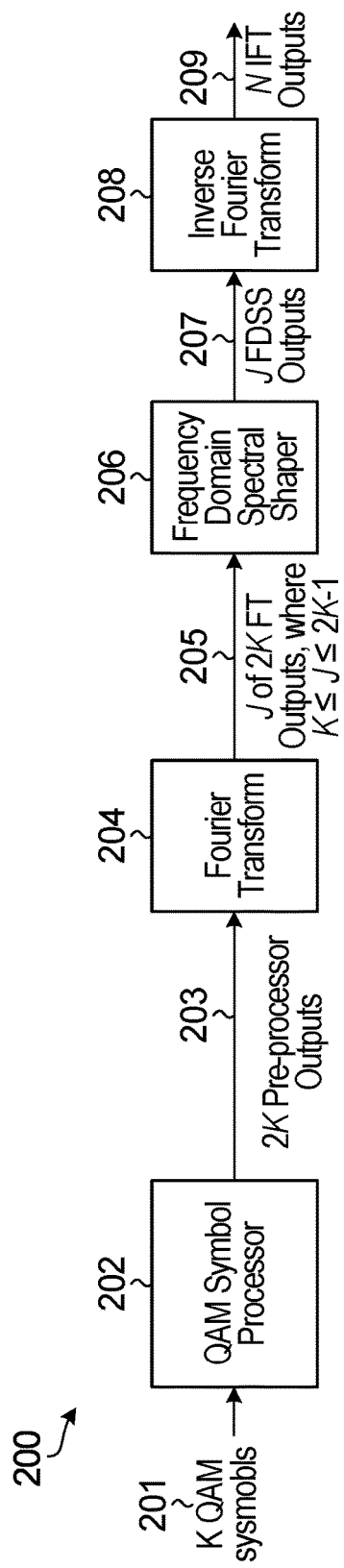

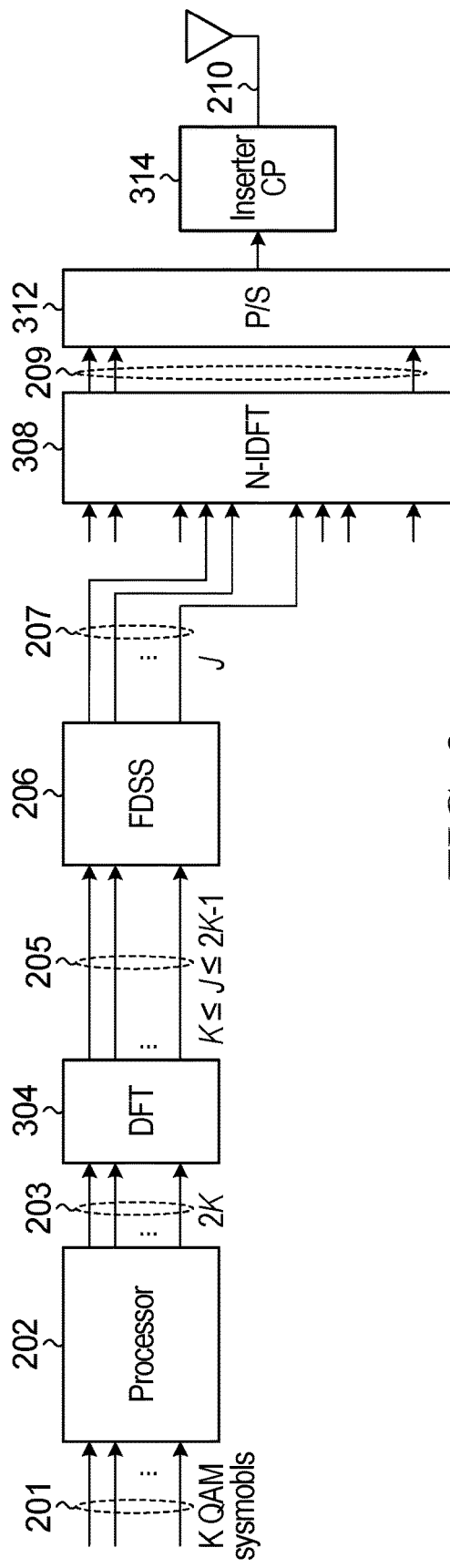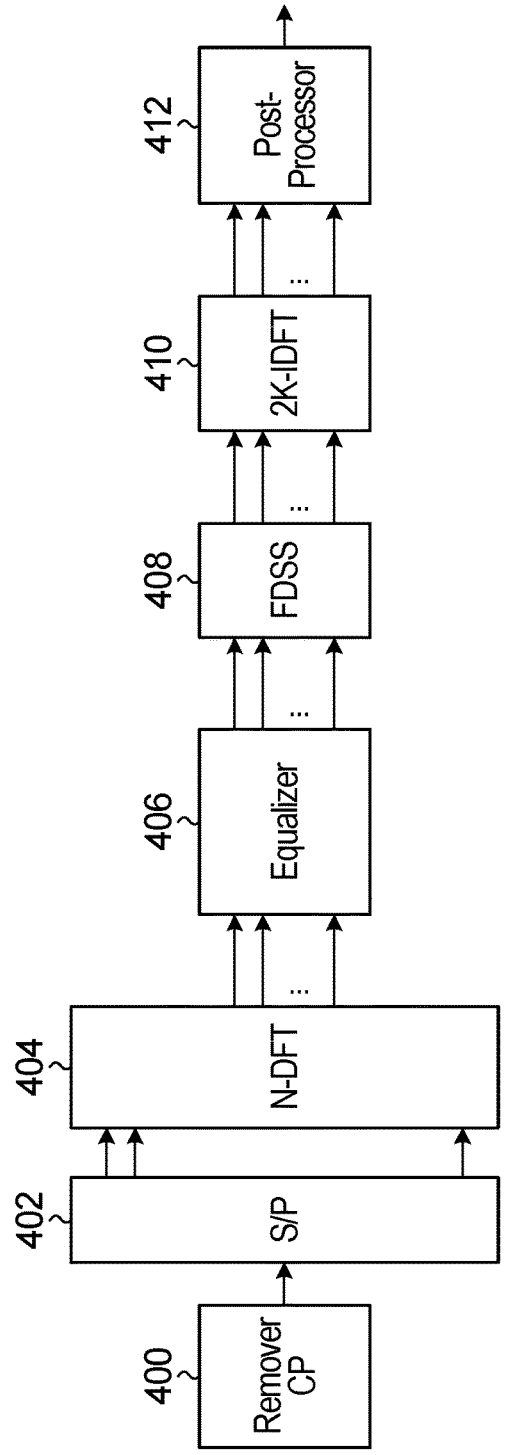
FIG. 3
FIG. 4

SYSTEM AND METHOD FOR TRANSMITTING AND RECEIVING SINGLE-CARRIER OQAM SYMBOLS WITH NON-NYQUIST TRANSMIT PULSE SHAPING

FIELD

The present invention relates generally to digital communications, and more particularly to a method and apparatus for transmitting single-carrier offset quadrature amplitude modulation (OQAM) symbols using frequency domain spectral spacing (FDSS).

BACKGROUND

Peak to Average Power Ratio (PAPR) is a signal characteristic used to describe the efficiency of power amplifiers. As power-limited communication devices use power amplifiers in the transmission of a signal, the impact of the PAPR becomes significant; as a result, it is especially beneficial to reduce the PAPR of signal waveforms used for transmissions from a power-limited device, such as uplink and sidelink transmissions in a wireless communication system.

Orthogonal Frequency Division Multiplexing (OFDM) is a method of modulating digital signal data, in which a single data stream is split across several subcarrier frequencies to reduce interference and cross talk. This waveform is found in the downlink of the Long Term Evolution (LTE) wireless standard. However, the standard OFDM waveform has a relatively large PAPR, wherein the maximum power of a sample in a given OFDM transmit symbol is large in proportion to the average power of said symbol. This indicates that a power amplifier using the OFDM waveform is relatively inefficient, and therefore less suitable for LTE uplink channels, which has lead to the development and use of alternative lower PAPR waveforms.

SUMMARY

A system and method are provided for processing symbols for transmission. A set of 2K outputs is produced that includes K real components and K imaginary components from K complex symbols. A Fourier transform operation on the 2K outputs produces 2K Fourier transform outputs. Transmit pulse shaping is applied to the 2K Fourier transform outputs. The transmit pulse shape may be Nyquist or non-Nyquist. An inverse Fourier transform operation on the J pulse shaped outputs produces an inverse Fourier transform output. In the receiver, equalization is performed to remove the effect of both the channel and the transmit pulse shape. Nyquist pulse shaping is performed by applying a Nyquist pulse shape prior to converting back to time domain. The approach avoids self-interference, even in situations where the transmit pulse shape is non-Nyquist. The transmitter is free to select a pulse shape to optimize PAPR without being concerned with interference.

According to one aspect of the present invention, there is provided a communication method comprising: producing a set of 2K outputs that include K real components and K imaginary components from K complex symbols; performing a Fourier transform operation on the 2K outputs to produce 2K Fourier transform outputs; pulse shaping the 2K Fourier transform outputs by multiplying each of J of the 2K Fourier transform outputs with a respective one of J non-zero coefficients, wherein the J non-zero coefficients represent a frequency response of a transmit pulse shape of a set of transmit pulse shapes, to produce J pulse shaped outputs, where $K \leq J \leq 2K$ for odd K, and $K+1 \leq J \leq 2K$ for even K; performing an inverse Fourier transform operation on the J pulse shaped outputs to produce an inverse Fourier transform output; and outputting the inverse Fourier transform output.

In some embodiments, the method further comprises: selecting the transmit pulse shape from the set of transmit pulse shapes, wherein the set of transmit pulse shapes including at least one non-Nyquist pulse shape.

In some embodiments, the method further comprises: selecting a value of J based on a target spectral efficiency vs. peak average power ratio (PAPR) trade-off.

In some embodiments, the method further comprises: selecting the transmit pulse shape with the objective of minimizing peak average power ratio (PAPR) as among the set of transmit pulse shapes for a given value of J and a given transmit constellation or modulation order.

In some embodiments, the method further comprises selecting the transmit pulse shape with the objective of minimizing out of band emissions as among the set of transmit pulse shapes for a given value of J and a given transmit constellation or modulation order.

Optionally, in any of the preceding embodiments, the set of transmit pulse shapes includes: raised root cosine (RRC), raised cosine (RC), Gaussian, Welch and Kaiser pulse shapes.

In some embodiments, the method further comprises: transmitting signalling conveying J and K; wherein the signaling comprises an index of a value of J from within a set of possible values; or an index of a value of K/J from within a set of possible values of K/J.

According to another aspect of the present invention, there is provided a communication method comprising: receiving a signal that was generated in part using frequency domain pulse shaping of J frequency domain samples prior to transmission with a transmit pulse shape having J non-zero coefficients; performing an N-DFT to produce N frequency domain samples, J samples of the N samples relating to the J frequency domain samples that were pulse shaped with the transmit pulse shape; channel equalizing L of the J samples by treating an effect of the transmit pulse shape to be part of the channel; Nyquist pulse shaping the L samples by multiplying each of the L samples with a respective one of L non-zero coefficients, wherein the L non-zero coefficients represent a frequency response of a Nyquist pulse shape, to produce L pulse shaped outputs; padding the L pulse shaped outputs with zeros to produce 2K frequency domain samples, where the L pulse shaped outputs are centered within the 2K frequency domain samples; performing a 2K-IDFT on the 2K frequency domain samples; and processing the 2K outputs to produce K complex symbols; wherein: K is a number of QAM symbols transmitted and received using the signal; $K \leq J \leq 2K$ for odd K, and $K+1 \leq J \leq 2K$ for even K; $J \geq L \geq K+1$ for even K and $J \geq L \geq K$ for odd K; L is odd; $N \geq K$ is the IDFT size.

Optionally, in any of the preceding embodiments, the Nyquist pulse shape is independent on the transmit pulse shape.

Optionally, in any of the preceding embodiments, the transmit pulse shape is one of a set of pulse shapes that includes: raised cosine; raised root cosine (RRC), Gaussian, Welch and Kaiser pulse shapes.

Optionally, in any of the preceding embodiments, performing channel equalization comprises determining, for each of the L samples: $q\_l = (h\_l \ r\_l)/(|h\_l|^2 + \sigma^2)$, where: $r\_l$ is the lth of the L of J samples; $h\_l$ is a channel estimate corresponding to the Ith of the L of J samples that includes the effect of the transmit pulse shape; $\sigma^2$ is a noise variance.

In some embodiments, the method further comprises: receiving signalling conveying J and K, wherein the signalling comprises an index of a value of J from within a set of possible values;or an index of a value of K/J from within a set of possible values of K/J.

According to another aspect of the present invention, there is provided an apparatus comprising: a processor and memory configured to perform the following steps: producing a set of 2K outputs that include K real components and K imaginary components from K complex symbols; performing a Fourier transform operation on the 2K outputs to produce 2K Fourier transform outputs; pulse shaping the 2K Fourier transform outputs by multiplying each of J of the 2K Fourier transform outputs with a respective one of J non-zero coefficients, wherein the J non-zero coefficients represent a frequency response of a transmit pulse shape of a set of transmit pulse shapes, to produce J pulse shaped outputs, where K≤J≤2K for odd K, and K+1≤J≤2K for even K; performing an inverse Fourier transform operation on the J pulse shaped outputs to produce an inverse Fourier transform output; and outputting the inverse Fourier transform output.

Optionally, in any of the preceding embodiments, the processor and memory configured to select the transmit pulse shape from the set of transmit pulse shapes, wherein the set of transmit pulse shapes including at least one non-Nyquist pulse shape.

Optionally, in any of the preceding embodiments, the processor and memory are further configured to perform the following: selecting a value of J based on a target spectral efficiency vs. PAPR trade-off.

Optionally, in any of the preceding embodiments, the processor and memory are further configured to perform the following: transmitting signalling conveying J and K.

According to another aspect of the present invention, there is provided an apparatus comprising: a processor and memory configured to perform the following steps: receiving a signal that was generated in part using frequency domain pulse shaping of J frequency domain samples prior to transmission with a transmit pulse shape having J non-zero coefficients; performing an N-DFT to produce N frequency domain samples, J samples of the N samples relating to the J frequency domain samples that were pulse shaped with the transmit pulse shape; channel equalizing L of the J samples by treating an effect of the transmit pulse shape to be part of the channel; Nyquist pulse shaping the L samples by multiplying each of the L samples with a respective one of L non-zero coefficients, wherein the L non-zero coefficients represent a frequency response of a Nyquist pulse shape, to produce L pulse shaped outputs; padding the L pulse shaped outputs with zeros to produce 2K frequency domain samples, where the L pulse shaped outputs are centered within the 2K frequency domain samples; performing a 2K-IDFT on the 2K frequency domain samples; and processing the 2K outputs to produce K complex symbols; wherein: K is a number of QAM symbols transmitted and received using the signal; K≤J≤2K for odd K, and K+1≤J≤2K for even K; J≥L≥K+1 for even K and J≥L≥K for odd K; L is odd; N≥K is the IDFT size.

Optionally, in any of the preceding embodiments, the Nyquist pulse shape is independent on the transmit pulse shape.

Optionally, in any of the preceding embodiments, performing channel equalization comprises determining, for each of the L samples: $q\_l = (h\_l\ r\_l)/(|h\_l|^2 + \sigma^2)$. where:

r_l is the lth of the L of J samples; h_l is a channel estimate corresponding to the Ith of the L of J samples that includes the effect of the transmit pulse shape; $\sigma^2$ is a noise variance.

In some embodiments, the apparatus further comprises: receiving signalling conveying J and K; wherein receiving signalling conveying J and K comprises receiving an index of a value of J from within a set of possible values or an index of a value of K/J from within a set of possible values of K/J.

According to another broad aspect, the disclosure provides a communication method comprising performing a Fourier transform operation on K complex symbols to produce K Fourier transform outputs; producing a set of 2K outputs that include K real components and K imaginary components from the K Fourier transform outputs; pulse shaping the 2K outputs by multiplying each of J of the 2K outputs with a respective one of J non-zero coefficients, wherein the J non-zero coefficients represent a frequency response of a transmit pulse shape of a set of pulse shapes, to produce J pulse shaped outputs, where K≤J≤2K for odd K, and K+1≤J≤2K for even K; performing an inverse Fourier transform operation on the J pulse shaped outputs to produce an inverse Fourier transform output; and outputting the inverse Fourier transform output.

BRIEF DESCRIPTION OF THE DRAWINGS

Embodiments of the disclosure will now be described with reference to the attached drawings in which:

FIG. 1: is a block diagram of an example of the FDSS technique applied to a $$\frac{\pi}{2}-$$

Figure 2B:
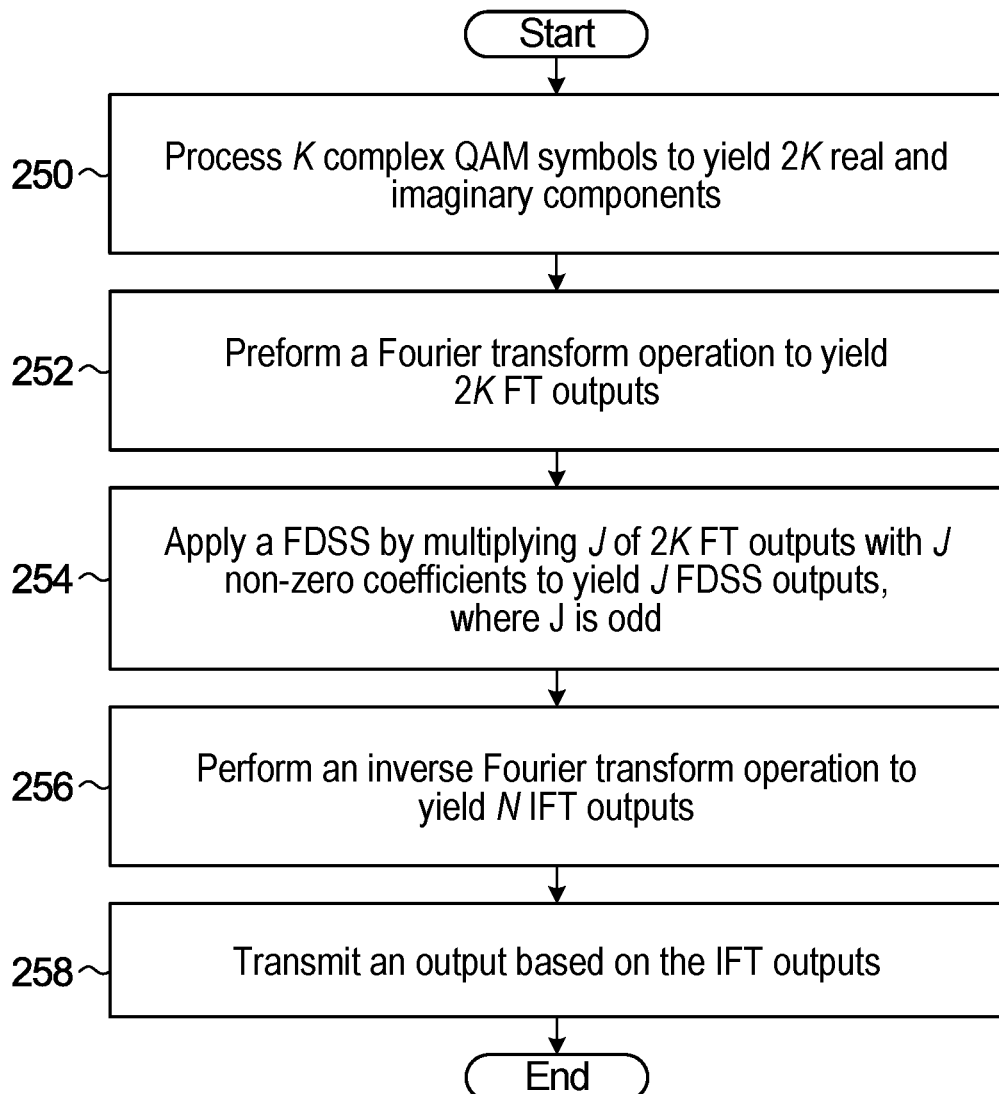
Figure 5:
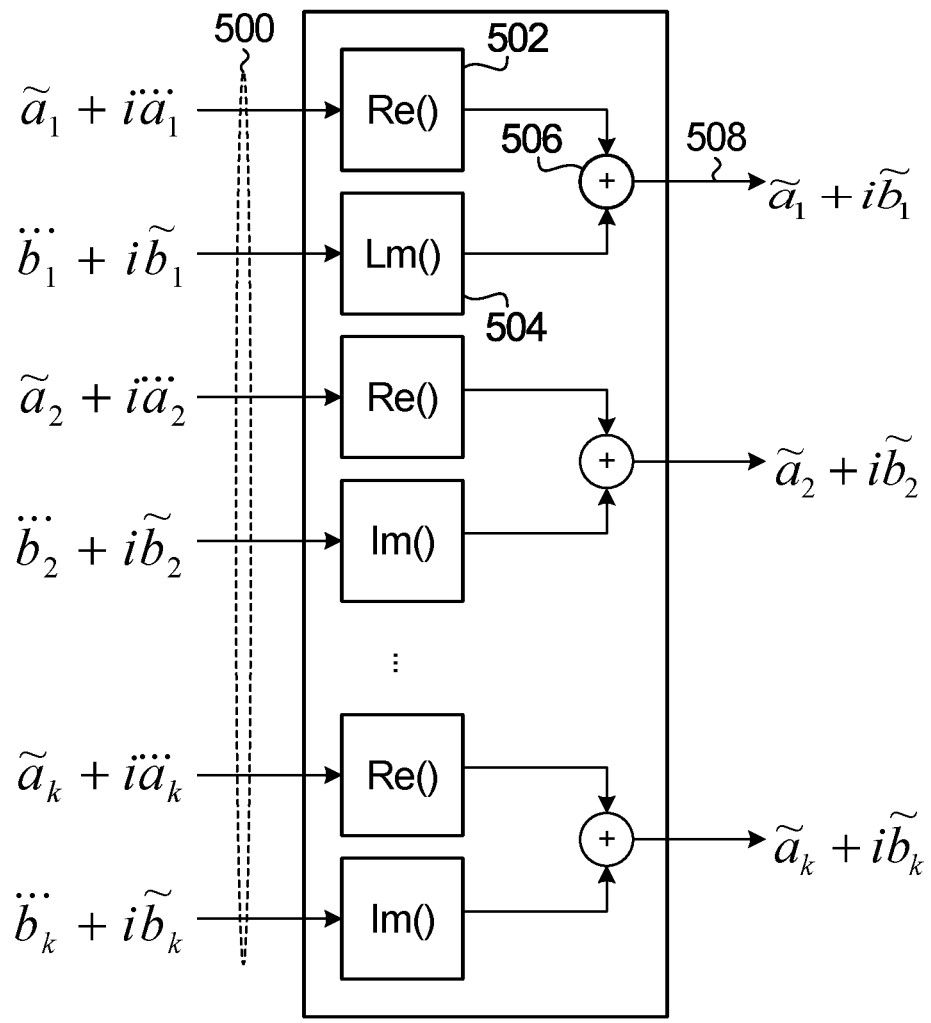
Figure 6:
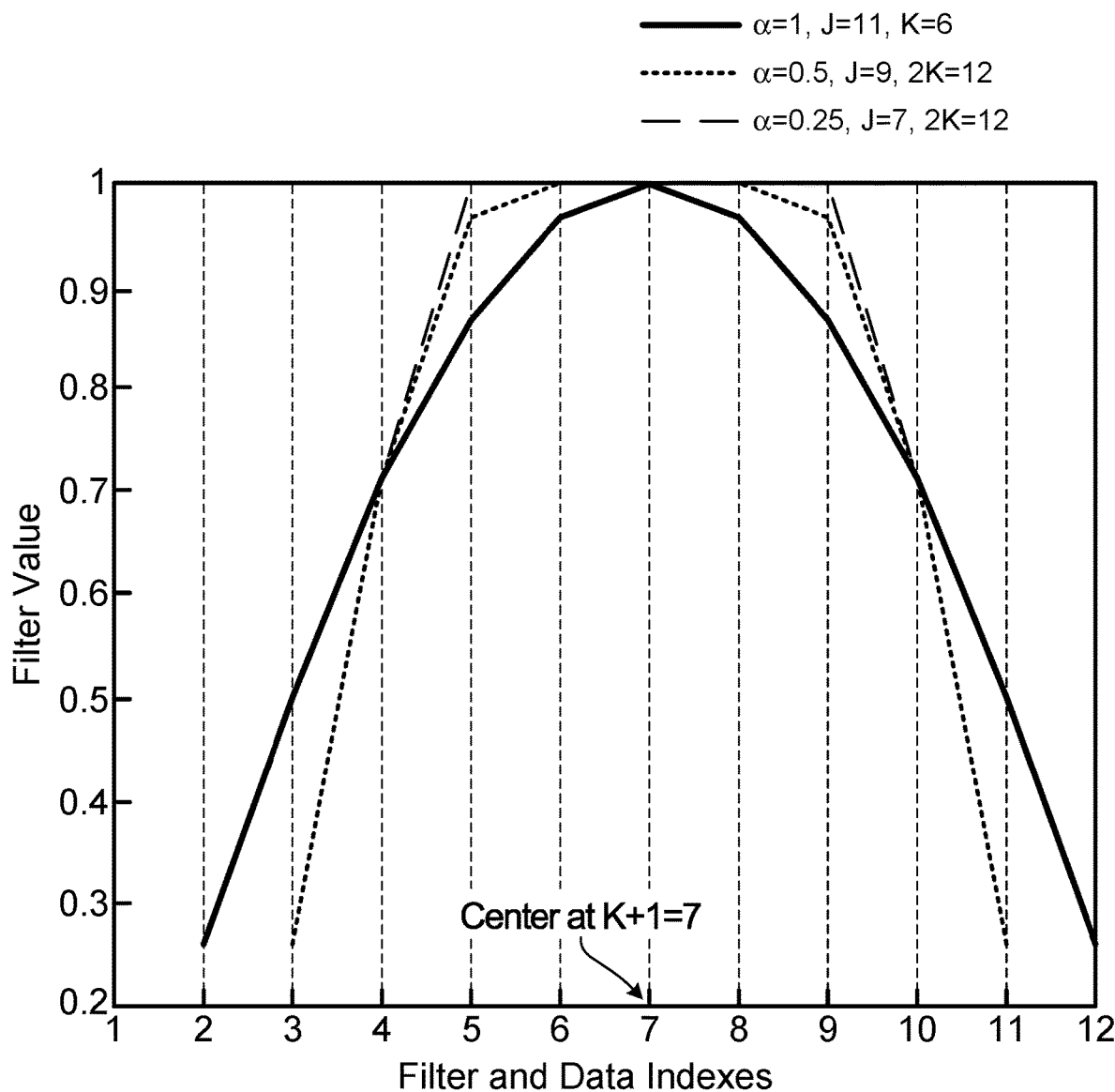
Figure 7:
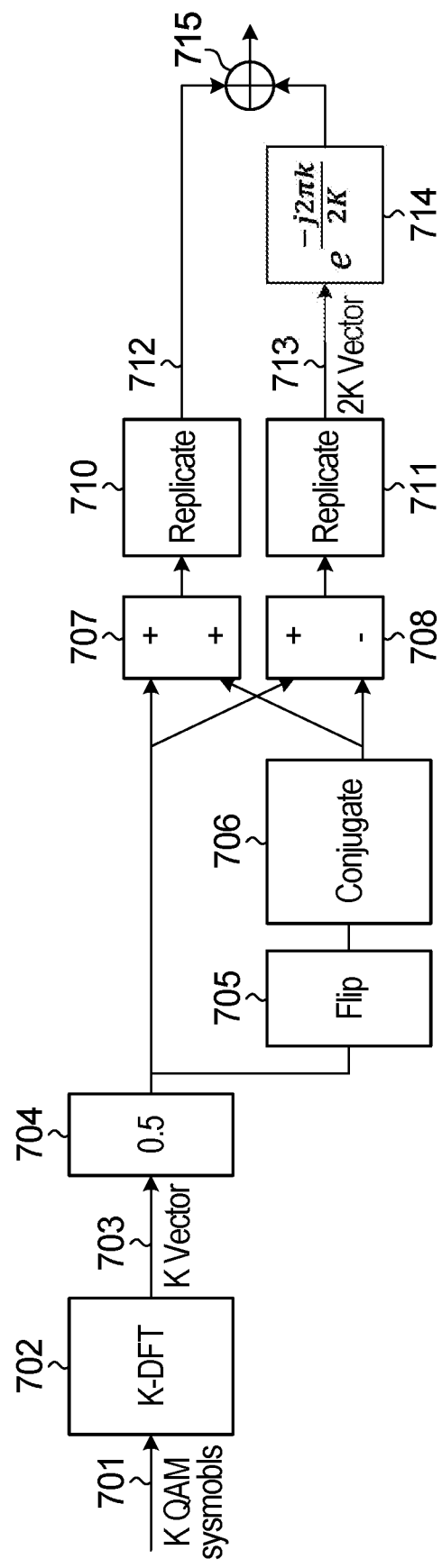
Figure 8:
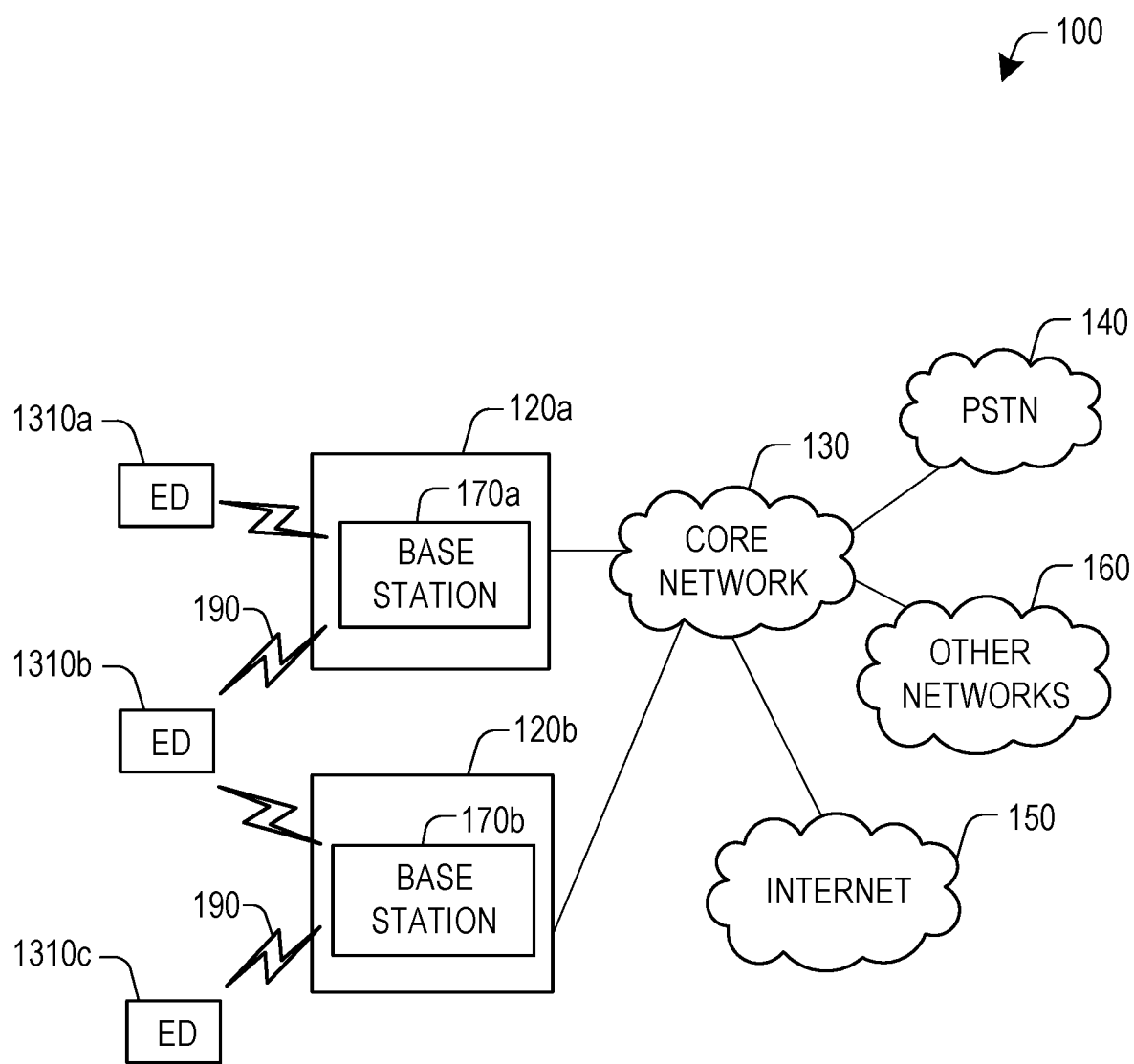
Figure 9A:
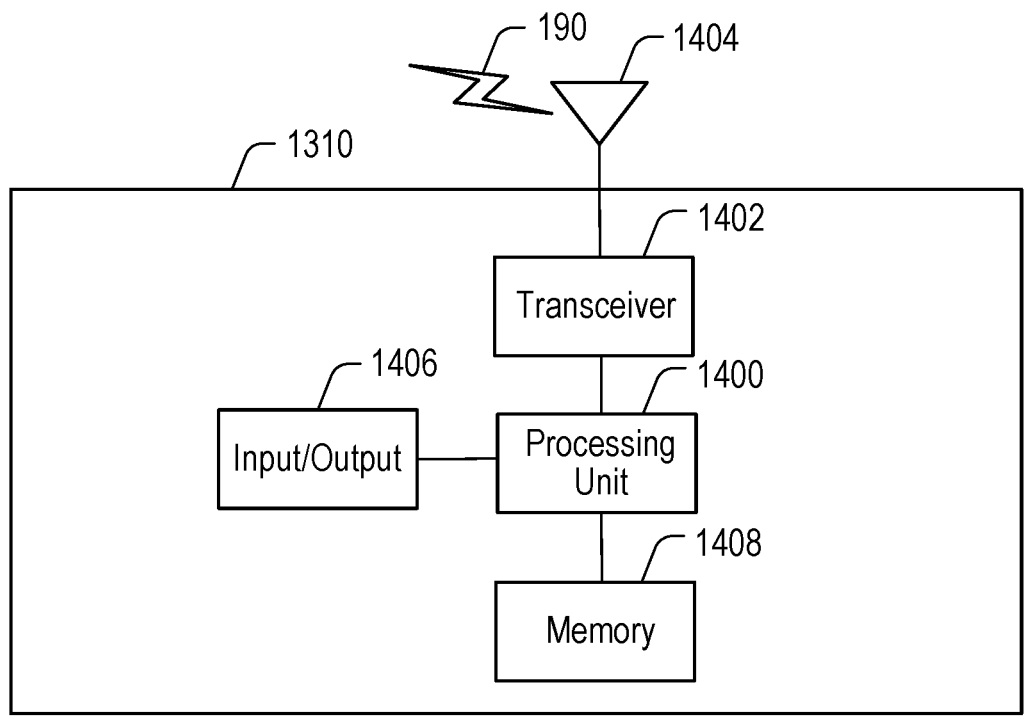
Figure 9B:
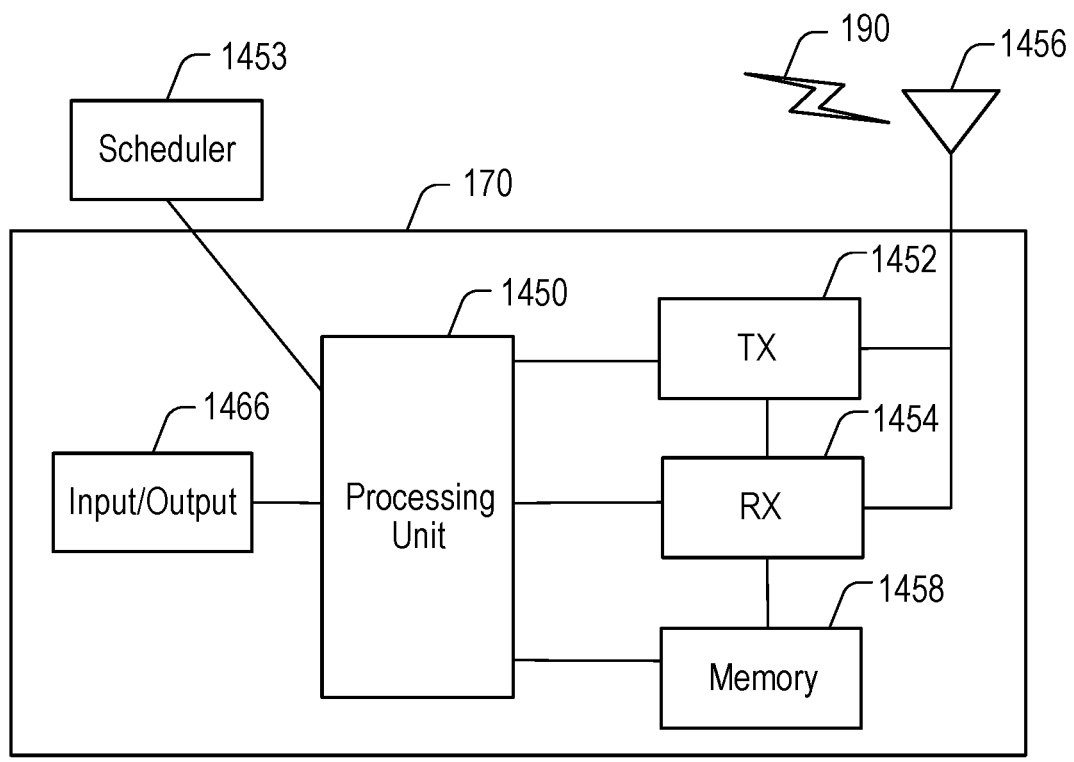
Figure 10:
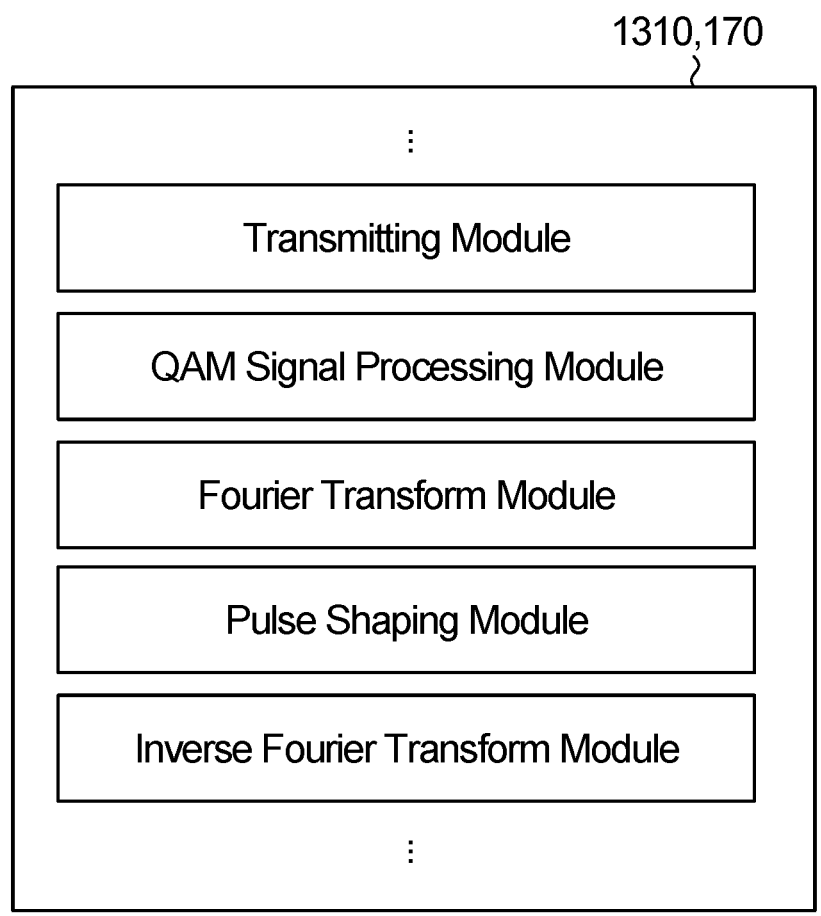
Figure 11:
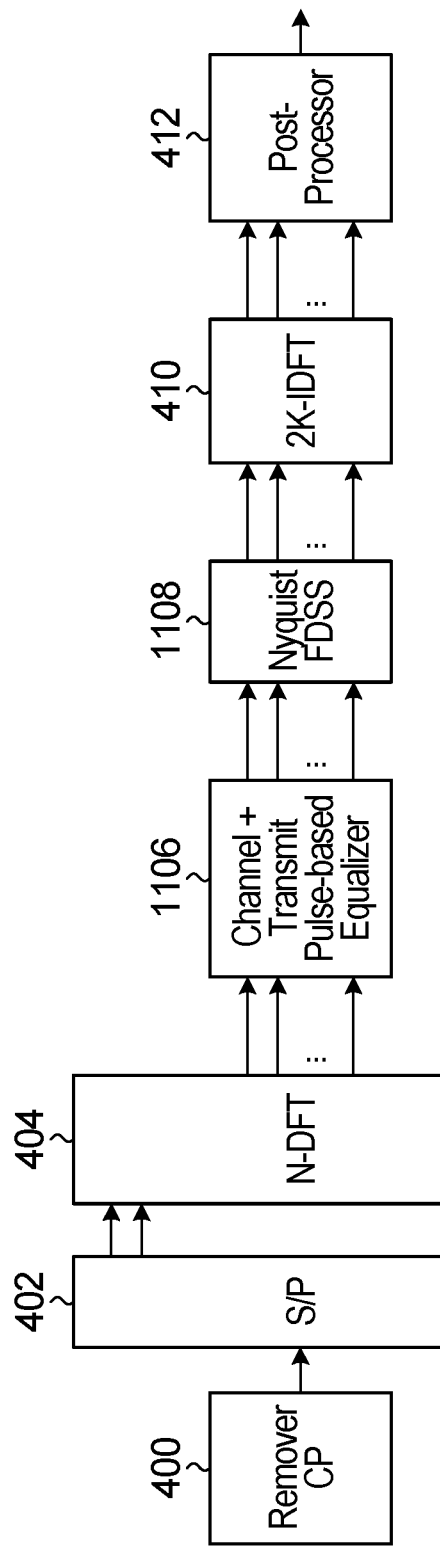
Figure 12:
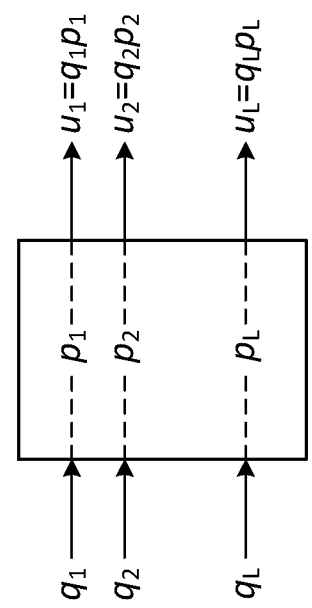
Figure 13:
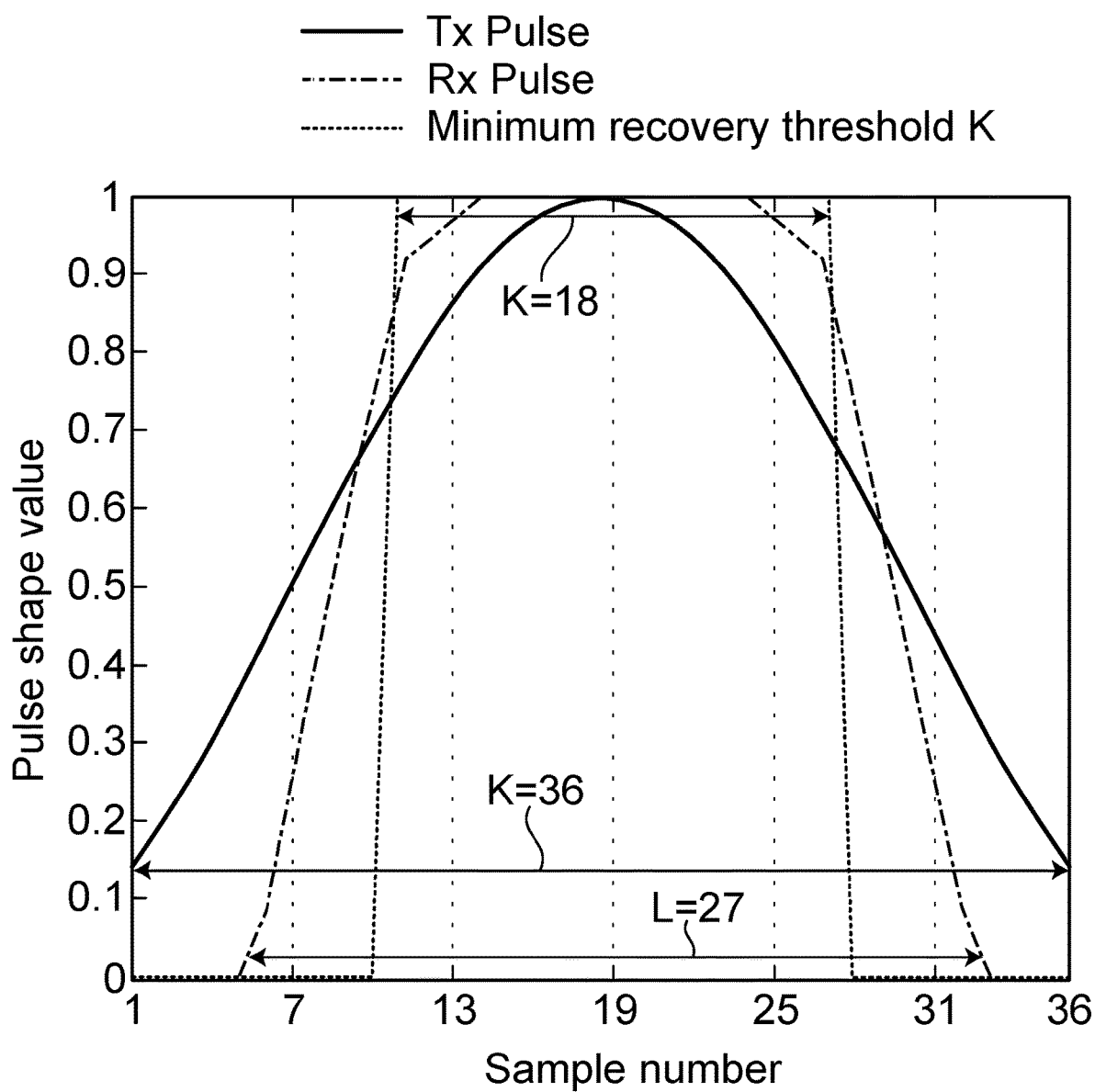
Figure 14:
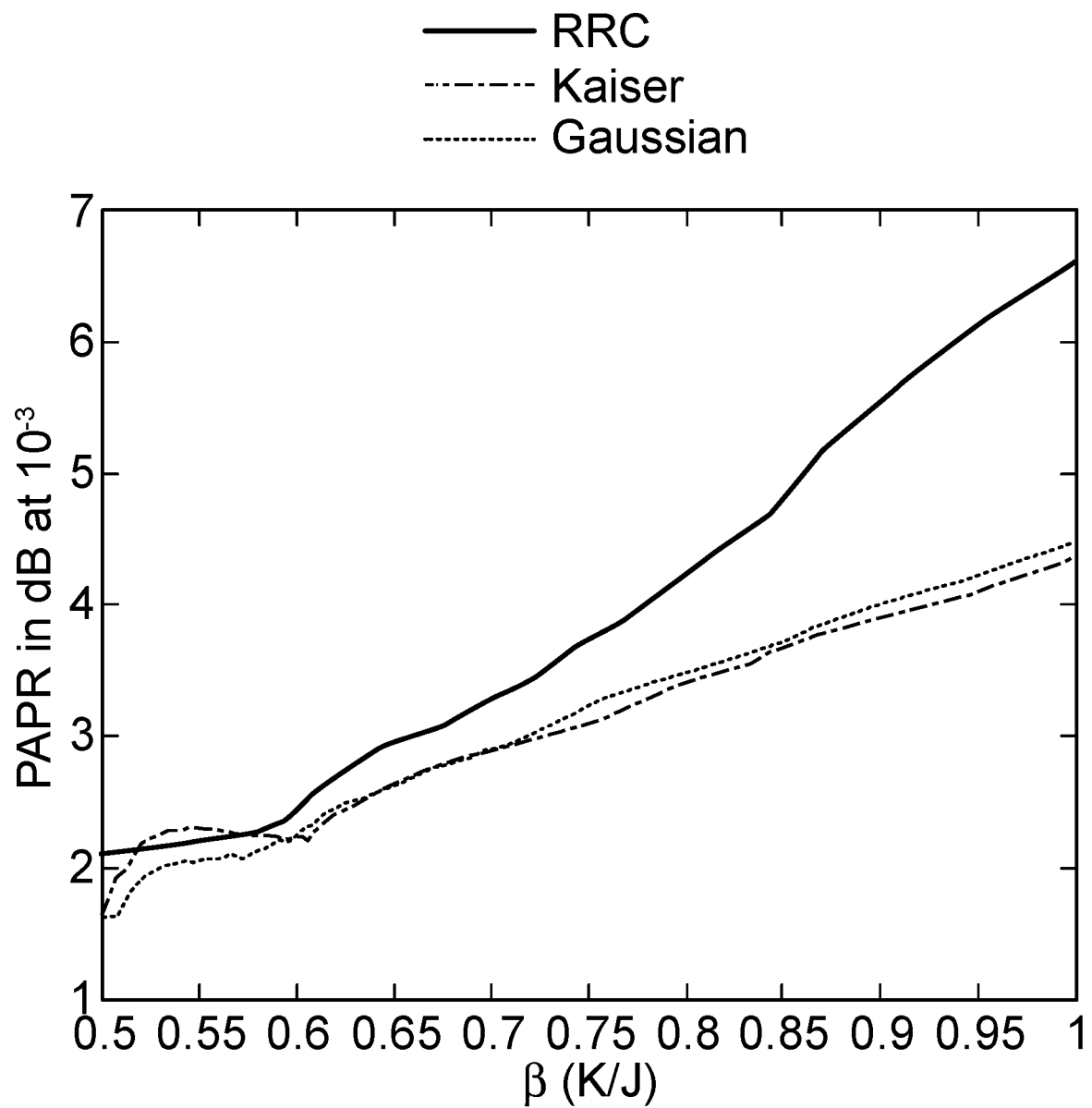
Figure 15:
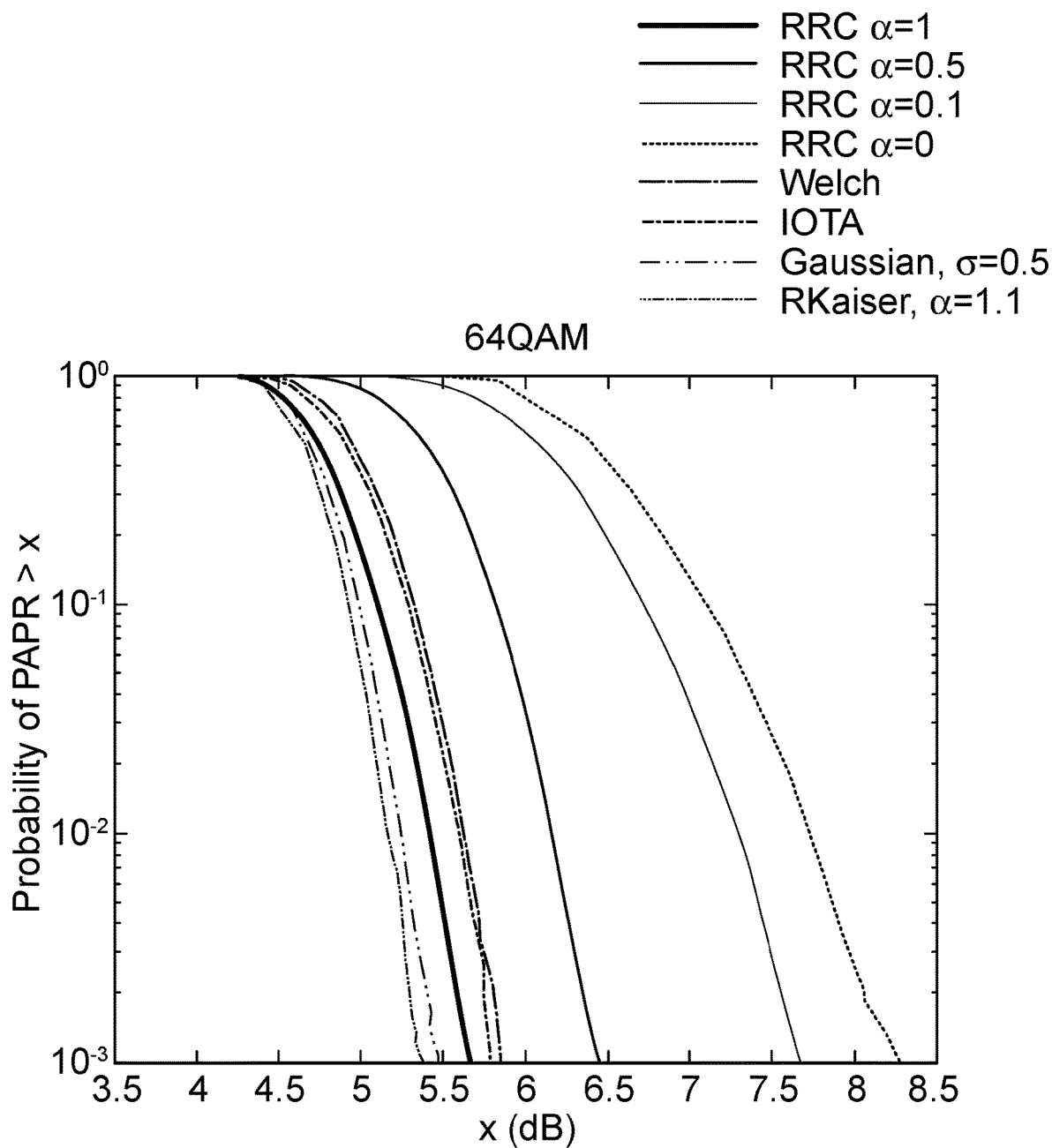
Figure 16:
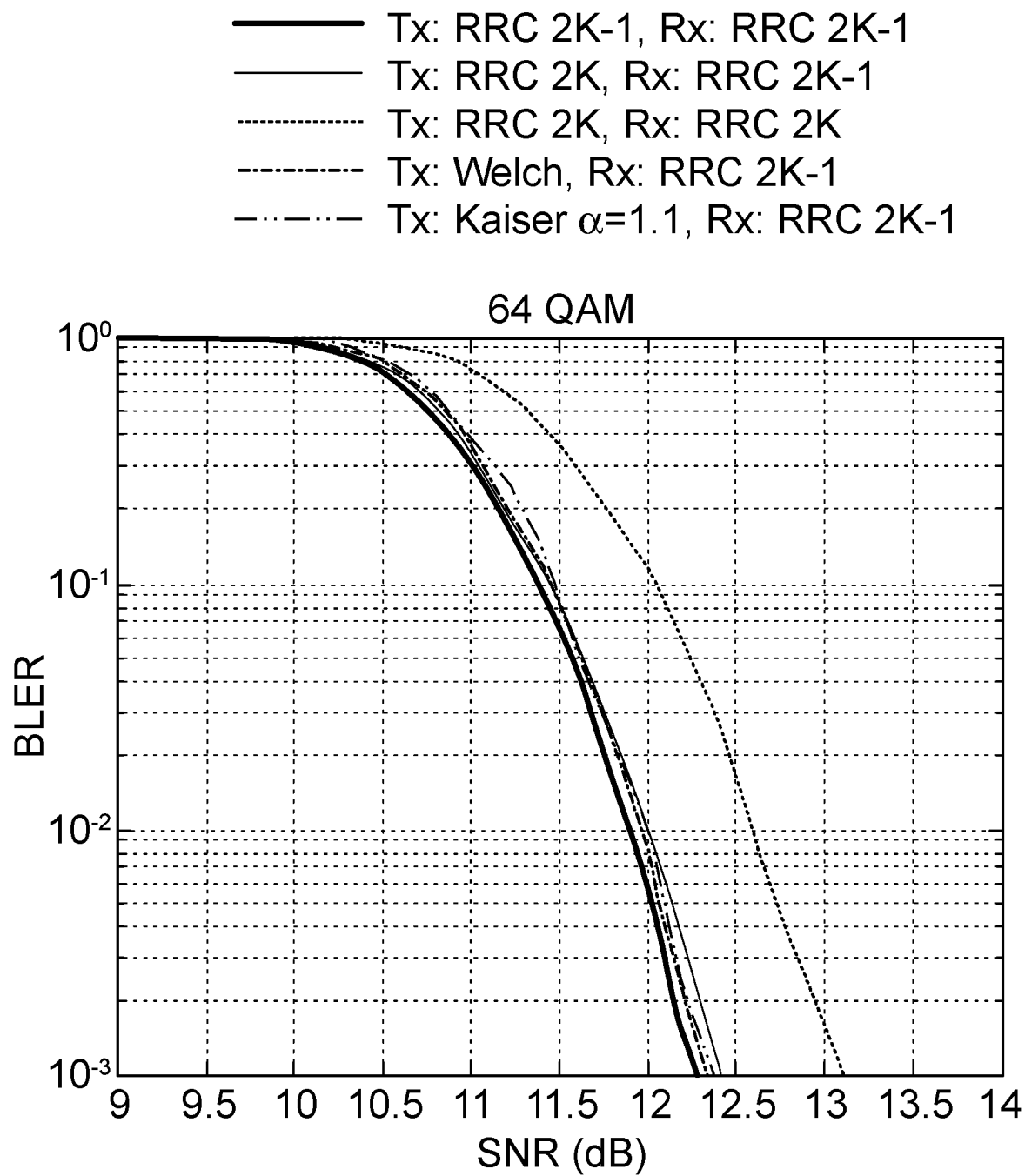

BPSK DFT-s-OFDM waveform in the transmitter of a communication device;

FIG. 2A: is a block diagram of a system for generating a low PAPR waveform in accordance with an embodiment of the disclosure;

FIG. 2B: is a flowchart of a method for a system for generating a low PAPR waveform in accordance with an embodiment of the disclosure;

FIG. 3: is a block diagram of another system for generating a low PAPR waveform in accordance with an embodiment of the disclosure;

FIG. 4: is a block diagram of a receiver for receiving a low PAPR waveform generated by the transmitter of FIG. 3 in accordance with an embodiment of the disclosure;

FIG. 5: is a block diagram of an example implementation of a post-processor for use within the receiver shown in FIG. 4 in accordance with an embodiment of the disclosure;

FIG. 6: is a plot exemplifying the relationship between the filter and data indices of several RRC pulses with respect to their filter values, $f_j$, for use within the FDSS operation of the transmitter shown in FIG. 3;

FIG. 7: is a block diagram exemplifying alternative operations that may be used in place of the processor and 2K-DFT blocks within the transmitter of FIG. 3 in accordance with an embodiment of the invention;

FIG. 8 is a network diagram of a communication system;

FIG. 9A is a block diagram of an example electronic device;

FIG. 9B is a block diagram of an example base station;

FIG. 10 is a block diagram of component modules;

FIG. 11 is a block diagram of a receiver for receiving a low PAPR waveform in accordance with an embodiment of the disclosure;

FIG. 12 depicts the application of a Nyquist pulse shape in the receiver to create real domain orthogonality;

FIG. 13 shows an example of the interplay between values of J,K and L;

FIG. 14 is a graph showing PAPR vs. spectral efficiency tradeoff;

FIG. 15 shows an example of PAPR performance;

FIG. 16 shows an example of BLER performance; and

Figure 17:
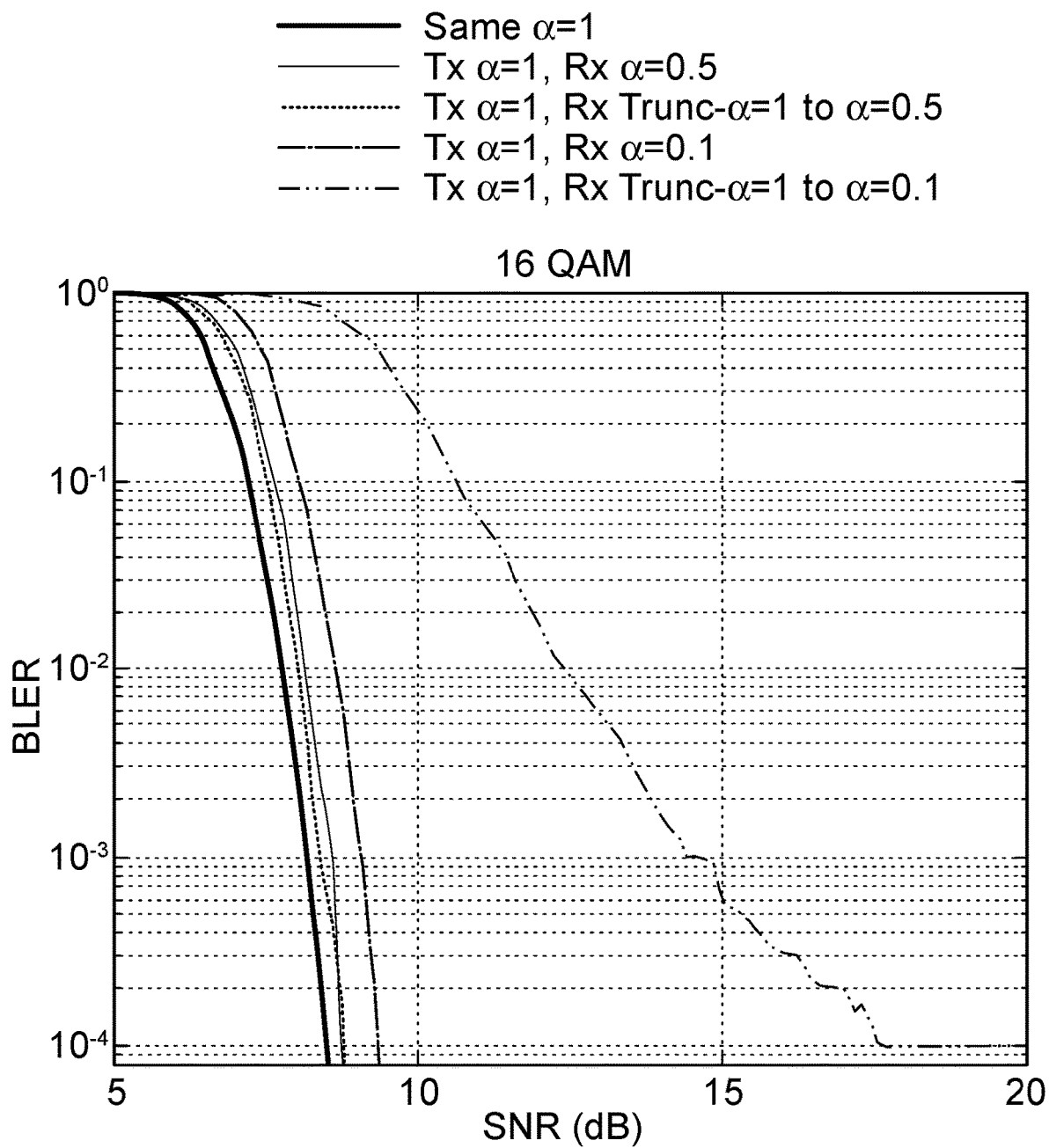

FIG. 17 shows an example of BLER performance for L≤J by choosing different values of RRC parameter β.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

A discrete Fourier transform spread orthogonal frequency division multiplexing (DFT-s-OFDM) waveform may be used in an effort to increase the power amplifier's efficiency over the OFDM waveform. Other techniques may be used in conjunction with such a waveform to further reduce the PAPR of the uplink channel. One such method is through the application of Frequency Domain Spectrum Shaping (FDSS), which changes the typical sinc pulse produced by the DFT-s-OFDM waveform into one with a lower PAPR.

FIG. 1 illustrates an example transmitter where FDSS has been applied to a $$\frac{\pi}{2} -$$

binary phase shift keying (BPSK) DFT-s-OFDM waveform in the communication channel's uplink. K symbols are input to a pre-processor 102, where the output is 2K symbols. The 2K symbols then undergo a discrete Fourier transform (DFT) 104 which produces 2K outputs. At least some of the 2K outputs may be repeated in the repeater 106 to produce J≥2K outputs. The J outputs are shaped by FDSS block 108 which produces J outputs. Within the FDSS block 108, the J data outputs are multiplied by J non-zero FDSS coefficients. The J length output is then fed to an N-inverse discrete Fourier Transform (IDFT) block 110 and then transmitted after parallel to serial (P/S) conversion 112.

One implementation of the FDSS shown in FIG. 1 is enhanced rotated QPSK. This implementation sets the number of non-zero FDSS coefficients to be J=2K, and thus the width of the pulse shape of the FDSS is even. Setting the value of J to be 2K ensures that there is no undesired bandwidth expansion.

While the PAPR of the DFT-s-OFDM waveform is reduced with the use of enhanced rotated QPSK FDSS, its implementation creates additional limitations on the input waveform. Although this technique is named after QPSK, it actually employs a BPSK constellation; therefore, enhanced rotated QPSK FDSS has the same spectral efficiency as BPSK modulation.

Only the BPSK constellation is suitable for enhanced rotated QPSK FDSS and higher order modulations (such as m-ary QAM) are not appropriate because these constellations or modulation schemes would require a larger number of FDSS coefficients J, where J>2K, resulting in unacceptable bandwidth expansion. Otherwise, implementing a higher order modulation with a smaller number of FDSS coefficients without bandwidth expansion would result in a loss of orthogonality. Likewise, the block error rate (BLER) performance of a higher order modulation implementation would degrade due to self-interference caused by the loss of orthogonality when using an enhanced rotated QPSK FDSS pulse with J=2K.

FIG. 2A is a block diagram of a transmitter provided by an embodiment of the disclosure. The transmitter 200 has a QAM symbol processor block 202 that receives K complex QAM symbols 201. The QAM symbol processor block 202 processes the K complex symbols 201 to produce 2K processor outputs 203. The 2K processor outputs 203, are input to a Fourier Transform (FT) block 204 (such as an FFT or DFT), which produces 2K FT outputs. A subset 205 containing J of the 2K outputs from the FT block 204, where K≤J≤2K−1, and J is odd, is input to a Frequency Domain Spectral Shaping (FDSS) block 206, yielding J FDSS outputs 207. The J FDSS outputs 207 are input to an Inverse Fourier transform (IFT) block 208 (such as an IFFT or IDFT), resulting in N IFT outputs 209, where N≥J, which are then output from the transmitter device. In some embodiments, the outputs may be from a modem. Optionally, the output may be transmitted by an antenna, possibly after being processed by further components not shown (for example parallel to serial conversion).

In operation, the K complex QAM symbols are input into the QAM symbol processor block 202. The QAM symbols may be from a QAM constellation of any order. In some embodiments, the QAM constellation is QPSK, 16 QAM, 64 QAM, although higher order constellations may also be used. K may be an even or odd number, and K>2. In some embodiments, K is an integer multiple of the number of tones in a resource block (RB). For example, where an RB contains 12 tones, K may be 12, 24, 36, etc. The processor block 202 produces the 2K outputs by separating the K QAM symbols 201 into their respective real and imaginary components, and the components are arranged in a sequence of each consecutive symbol's real component followed by its imaginary component from the first to the Kth symbol.

The FT block 204 applies a 2K Fourier transform operation to the 2K symbols 203, producing the 2K-FT outputs. Following the FT operation, a subset containing J of the 2K-FT outputs 205 is input into the FDSS block 206. In instances where the value of K is odd, K≤J≤2K−1; alternatively, K may be an even value, in which case K+1≤J≤2K−1 since J must be odd. The value of J is dependent on the pulse shape of the FDSS.

The output of the Fourier transform operation may be cyclically shifted in some implementations. Cyclic shifting is described in further detail below more specifically, where the Fourier transform operation is a 2K DFT. The J of the 2K FT outputs 205 are centered on the K+1-th FT output in an implementation where an output of the Fourier transform operation is not cyclically shifted. The J of 2K FT outputs 205 are centered on the first FT output in an implementation where the 2K FT outputs are cyclically shifted by K.

The FDSS block 206 multiplies each of the J of 2K DFT outputs 205 with a respective one of J non-zero coefficients representing the frequency response of a conjugate symmetrical pulse shape. In this manner, the frequency domain pulse shaper 206 produces the J FDSS outputs 207.

The J FDSS outputs 207 are input to the inverse Fourier Transform block 208. In some embodiments, the inverse Fourier Transform block 208 is an inverse discrete Fourier transform block with N inputs (N-IDFT). Typically, not all of the inputs are available for useful data. Some may be reserved for guardbands, for example. The number of useful subcarriers is referred to herein as $N_{useful}$. In this case, the value of J is less than or equal to $N_{useful}$. The inverse Fourier Transform block 208 produces N IFT outputs 209 (which again can be from a modem), which are then output from the transmitter device and optionally transmitted using an antenna. In practice, the value J is less than or equal to $N_{useful}$, such that other inputs can also be processed by the inverse Fourier Transform block. Specifically, $N_{useful}$-J other N-IDFT inputs can be processed by the N-IDFT in parallel for inputs related to the single transmitter chain described above.

FIG. 2B: is a flowchart of a method for system for generating a low PAPR waveform in accordance with an embodiment of the disclosure. The method may, for example, be implemented using the transmitter of FIG. 2A. The method begins with block 250 with processing a set of K complex QAM symbols by separating the K complex QAM symbols into K real components and K imaginary components to produce a set of 2K outputs containing in sequence the real component of the first symbol, the imaginary component of the first symbol, the real component of the second symbol, the imaginary component of the second symbol , . . . , the real component of the Kth symbol, the imaginary component of the Kth symbol, where K>=2. The method continues in block 252 with performing a Fourier Transform operation on the 2K outputs to produce 2K Fourier transform outputs. The method continues in block 254 with performing frequency domain spectral shaping (FDSS) by multiplying each of J of the 2K Fourier transform outputs with a respective one of J non-zero coefficients, wherein the J non-zero coefficients represent a frequency response of a conjugate symmetrical pulse shape, to produce J FDSS outputs, where J is odd and, K≤J≤2K–1. J of the 2K Fourier transform outputs are centered on the K+1-th Fourier transform output in a case where an output of the Fourier Transform operation is not cyclically shifted or the J of the 2K Fourier transform outputs are centered on the 1st Fourier transform output in a case the 2K Fourier transform outputs are cyclically shifted by K. The method continues in block 256 with processing the J FDSS outputs with an inverse Fourier Transform operation to produce N inverse Fourier transform outputs. Finally, in block 258, an output based on the N Fourier Transform outputs is outputted or transmitted.

Advantageously, compared to the approach of FIG. 1, the approach of FIGS. 2A and 2B does not have self-interference with the result that better BLER performance may be possible. For the same reason, the provided method and system is applicable to any modulation order and without bandwidth expansion, whereas FIG. 1 is typically limited to the enhanced rotated QPSK implementation, with the resulting BSPK spectral efficiency. The provided system and method have the flexibility to use K≤J≤2K–1 FDSS lengths (J=K only holds when K is odd). This creates the flexibility to implement a design that can trade-off between PAPR vs spectrum efficiency. For example, if a QPSK constellation is employed and J=K (K must be odd), the result is poorer (larger) PAPR but better spectral efficiency than a design having J>K. Furthermore, this specific design of J=K would still have the advantage of exhibiting the same spectral efficiency as QPSK DFT-s-OFDM, yet with lower PAPR than QPSK DFT-s-OFDM.

The output of the provided system and method is a circular convolved single carrier offset QAM (OQAM) waveform. This has a real domain orthogonality condition and thus avoids self-interference. Further, a range of pulse shapes with different spectrum efficiencies can be used.

Referring now to FIG. 3, shown is an example of a more detailed implementation of the transmitter of FIG. 2A. The transmitter of FIG. 3 differs from that of FIG. 2A in that the Fourier Transform 204 of FIG. 2A is specified to be a discrete Fourier Transform 304 (such as an FFT); the inverse Fourier transform 208 of FIG. 2A is specified to be an N-IDFT 308 (an inverse discrete Fourier Transform having N inputs, such as an N-IFFT), and shown are further processing elements that include a parallel to serial converter 312 and a cyclic prefix (CP) inserter 314.

The processor 202 takes K QAM symbols from any constellation (e.g. QPSK, 16 QAM, 64 QAM, etc.) and separates them to real and imaginary components. K can be odd or even number. The result is a set of outputs that include 2K real and imaginary symbols. Let $a_1+ib_1$, $a_2+ib_2$, . . . , $a_K+ib_K$ be the parallel K number of QAM symbols, then 2K parallel outputs can be expressed as $a_1$, $ib_1, a_2, ib_2, \ldots, a_K, ib_K$.

The DFT 304 takes the 2K inputs $a_1, ib_1, a_2, ib_2, \ldots, a_K$, $ib_K$ and performs a 2K-DFT. There are two well-known ways to index 2K-DFT output: First $\bar{s}_1, \bar{s}_2, \ldots, \bar{s}_{2K}$ and second is $\bar{s}_0, \bar{s}_1, \ldots, \bar{s}_{2K-1}$. Only J out of 2K DFT outputs will be subject to further processing as detailed below.

As mentioned, J is always an odd number. If K is odd then K≤J≤2K–1. If K is even then K+1≤J≤2K–1. The value of J depends on the pulse shape. The FDSS coefficients $f_1$, $f_2, \ldots, f_J$ represent non-zero frequency components of a conjugate symmetrical pulse. In some embodiments the coefficients represent a real Nyquist pulse.

A root raised cosine (RRC) is an example of a pulse that can be used. Let $F(\omega)$ be the frequency response of the RRC. By definition $F(\omega)$ is zero for $\omega \geq (1+\beta)/2T$ where $1/T$ is the Nyquist rate. All J non-zero samples of $F(\omega)$ are used as the FDSS coefficients. In this case $$f_{\frac{J+1}{2}} = F(0).$$

First Indexing Method

In some embodiments, the first indexing method ($\bar{s}_1$, $s_2, \ldots, \bar{s}_{2K}$) is used. In this situation, there are two ways to perform FDSS.

In a first approach, J FDSS outputs are given by:

$$d_1, d_2, \ldots, d_J = f_1 \bar{s}_{K-\frac{J-1}{2}+1}, f_2 \bar{s}_{K-\frac{J-1}{2}+2}, \ldots, f_{\frac{J+1}{2}} \bar{s}_{K+1}, \ldots, f_J \bar{s}_{K+\frac{J+1}{2}},$$

where the center is $\bar{s}_{K+1}$.

In a second approach, the 2K-DFT outputs are cyclically shifted by K but the pulse coefficients are kept as is. In this case, J FDSS outputs can be found by cyclic shifting 2K-DFT output by K, which are given by:

$$d_1, d_2, \ldots, d_J = f_1 \bar{s}_{2K-\frac{J-1}{2}+1}, f_2 \bar{s}_{2K-\frac{J-1}{2}+2},$$
$$\ldots, f_{\frac{J-1}{2}} \bar{s}_{2K}, f_{\frac{J+1}{2}} \bar{s}_1, f_{\frac{J+1}{2}+1} \bar{s}_2, \ldots, f_J \bar{s}_{\frac{J+1}{2}},$$

where the center is $\bar{s}_1$.

This can be understood by assuming $\bar{s}_1, \bar{s}_2, \ldots, \bar{s}_{2K}$ are arranged in a circle where in the first approach $\bar{s}_{K+1}$ is the center and in the second approach, $\bar{s}_1$ is the center.

Second Indexing Method

In some embodiments, the second indexing method ($\bar{s}_0, \bar{s}_1, \ldots, \bar{s}_{2K-1}$) is used. Two equivalent approaches are available. In the first approach, the J FDSS outputs are given by:

$$d_1, d_2, \ldots, d_J = f_1 \bar{s}_{K-\frac{J-1}{2}}, f_2 \bar{s}_{K-\frac{J-1}{2}+1}, \ldots, f_{\frac{J+1}{2}} \bar{s}_K, \ldots, f_J \bar{s}_{K+\frac{J+1}{2}-1},$$

where the center is $\bar{s}_K$.

In the second approach, the J FDSS outputs can be found by cyclic shifting 2K-DFT output by K, which are given by:

$$d_1, d_2, \ldots, d_J = f_1 \bar{s}_{2K-\frac{J-1}{2}}, f_2 \bar{s}_{2K-\frac{J-1}{2}+1}, \ldots,$$
$$f_{\frac{J-1}{2}} \bar{s}_{2K-1}, f_{\frac{J+1}{2}} \bar{s}_0, f_{\frac{J+1}{2}+1} \bar{s}_1, \ldots, f_J \bar{s}_{\frac{J+1}{2}-1},$$

where the center is $\bar{s}_0$.

Receiver

In the following description of the receiver, the first indexing method $\bar{s}_1, \bar{s}_2, \ldots, \bar{s}_{2K}$, is used, but a similar approach can be employed for a case where the second indexing method is used.

FIG. 4 is a block diagram of a receiver provided by an embodiment of the disclosure suitable for use with the transmitter of FIG. 3. Shown are the following blocks connected together in sequence: CP remover block 400, serial to parallel converter 402, N-DFT block 404, equalizer 406, FDSS block 408, 2K-IDFT block 410, and post-processor 412. These functional blocks perform the inverse of the operations described for the transmitter. Only the relevant J frequency components are taken from the output of the N-DFT 404. Note this receiver employs one tap equalization.

The FDSS block 408 takes J outputs from the N-DFT 404 and multiplies the j outputs with J non-zero coefficient $f^*_1, f^*_2, \ldots, f^*_J$. These coefficients are the complex conjugates of $f_1, f_2, \ldots, f_J$ used in the transmitter. As the pulse is real and even symmetrical, the frequency response is real and even symmetrical. Thus, $f^*_j = f^*_j$. Note that de-mapping from N to J performed in the receiver corresponds with the mapping of J to N in the transmitter.

The output $\bar{s}_1, \bar{s}_2, \ldots, \bar{s}_J$ of the FDSS block 408 is zero padded from both sides to form a 2K vector, which is used as the input of 2K-IDFT 410. Let the output be $\tilde{a}_1 + i\tilde{\ddot{a}}_1, \tilde{b}_1 + i\tilde{b}_1, \tilde{a}_2 + i\tilde{\ddot{a}}_2, \tilde{b}_2 + i\tilde{b}_2, \ldots, \tilde{a}_K + i\tilde{\ddot{a}}_K, \tilde{b}_K + i\tilde{b}_K$. In here, i $\tilde{\ddot{a}}_k$ is the imaginary interference to real signal $\tilde{a}_k$ and similarly $\tilde{b}_k$ is real interference to imaginary signal $i\tilde{b}_k$.

The post-processor 412 takes the 2K inputs $\tilde{a}_1 + i\tilde{\ddot{a}}_1, \tilde{b}_1 + i\tilde{b}_1, \tilde{a}_2 + i\tilde{\ddot{a}}_2, \tilde{b}_2 + i\tilde{b}_2, \ldots, \tilde{a}_K + i\tilde{\ddot{a}}_K, \tilde{b}_K + i\tilde{b}_K$ as input and outputs K QAM symbols $\tilde{a}_1 + i\tilde{b}_1, \tilde{a}_2 + i\tilde{b}_2, \ldots, \tilde{a}_K + i\tilde{b}_K$ by combining the real and imaginary values into complex values. These are the received QAM symbols which may then be subject to further processing. The imaginary interference to the real signal and the real interference to the imaginary signal are removed in the post-processor 412.

FIG. 5 is a block diagram of an example implementation of the post-processor which processes the 2K inputs. The functionality for processing the first two inputs $\tilde{a}_1 + i\tilde{\ddot{a}}_1, \tilde{b}_1 + i\tilde{b}_1$ of inputs 500 will be described by way of example. The first input $\tilde{a}_1 + i\tilde{\ddot{a}}_1$, is input to a Re( ) operator 502 which takes a complex input and outputs the real part of that complex input. The second input $\tilde{b}_1 + i\tilde{b}_1$ is input to a Im( ) operator 504 which takes a complex input and outputs the imaginary part of that complex input. The outputs of the Re( ) operator 502 and the Im( ) operator 504 are combined in adder 506 to produce the output $\tilde{a}_1 + i\tilde{b}_1$ 508.

FIG. 6 shows several examples of different RRC pulses that may be used in the FDSS block. Shown are examples where K=6, and where J=11, 9, or 7. In each case, the pulse is centered at K+1=7. Note the pulse shape has an effect on PAPR.

In the described embodiments, the FDSS length is odd and conjugate symmetrical such that the pulse is real in time domain. In some embodiments, the pulse is a Nyquist pulse. This above fact together with the specific way that the pulse is centered on the data output by the DFT generates a circular convolved single carrier OQAM signal with real domain orthogonality. As such, there is no loss of orthogonality, contrary to the case described with reference to FIG. 1. In addition, since there is real domain orthogonality, the provided system and method do not have self-interference, and therefore can be applicable to any QAM modulation order.

As a further advantage, use of excessive bandwidth is not needed. K≤J≤2K−1 subcarriers are allocated to transmit the K QAM symbols in comparison to enhanced rotated QPSK described with reference to FIG. 1, which uses J=2K subcarriers. Therefore, the provided system and method provides an efficient tradeoff between PAPR and spectrum efficiency in comparison to DFT-s-OFDM. Furthermore, when J=K, the spectral efficiency is the same as DFT-s-OFDM but with lower PAPR.

The QAM symbol processor and 2K-DFT can be replaced with a K-DFT and further operations. This may be accomplished because the data signals are either real or imaginary. FIG. 7 is a block diagram of functional elements that can be used to replace the processor and 2K-DFT in the transmitter diagram.

Like the processor shown in the transmitter block diagram in FIG. 3, K QAM symbols 701 are used as an initial input. In this embodiment, the K symbols 701 are first input to a K-DFT block 702. The K-DFT block 702 produces a vector of length K 703, which is then input into multiplication block with a multiplication factor of 0.5 704. The resulting product is then used as the input to a flip operation block 705 and as a positive valued input into summation block 707 and 708. The output of the flip operation block is input to a conjugate block 706, wherein the resultant output is used as an input to summation block 707 as a positive value and summation block 708 as a negative value. The sums yielded by summation blocks 707 and 708 are then input into replication operation blocks 710 and 711, each producing a vector of length 2K 712 and 713. One of the vectors 713 is input to a multiplication block 714, wherein the vector 713 is multiplied by a factor of $$e^{-\frac{j\pi k}{2K}}.$$

The output yielded from block 714 and the vector of length 2K 712 produced by replication operation block 710 are added together at summation node 715. The output of the summation node 715 may then enter a FDSS and be processed through the remaining blocks as described previously with reference to FIG. 3.

In the above block diagram, the flip operation reverses the order of the vector. The conjugate block outputs the conjugate of the input vector. The replicate operations replicate the K length vector twice to obtain 2K length vector. The multiply operation 714 multiplies the k−1-th element by $$e^{-\frac{j\pi k}{2K}}$$

factor, for each value of k from 1 to 2K. The complexity of this approach is K (log K+C) where C is a constant while 2K-FFT has a complexity of 2K log 2K.

An advantage of using the approach of FIG. 7 is that by replacing 2K-DFT with K-DFT, complexity overhead can be reduced. DFT-s-OFDM uses K-DFT, thus this approach matches the same complexity order as DFT-s-OFDM.

In some embodiments, for any of the embodiments described herein, the number of J subcarriers is adjusted adaptively. This may be done with a fixed periodicity, or when certain trigger conditions are met. J can be adjusted adaptively based on any suitable metric. In a specific example, J is adjusted to achieve a desired PAPR. Changing J will necessarily change the pulse shape used in the FDSS operations.

Recall that K≤J≤2K−1 is a subset of the 2K Fourier outputs, and J is equal to the number of non-zero coefficients in the FDSS pulse shape. In some embodiments, the adjusted number of J subcarriers has a fixed relationship with the size of the QAM constellation (i.e., the modulation order), such that by updating the QAM constellation size, the value of J is updated accordingly to corresponding value for the new QAM constellation size. The QAM constellation size may be adaptively adjusted on some basis, and then the value of J that is used is tied to that constellation size. An inversely proportional relationship exists between the QAM constellation size of a given input and its resultant PAPR.

Furthermore, the number of J subcarriers required to achieve a target PAPR may be determined based on characteristics of a known FDSS pulse shape. For instance, there exists an inversely proportional relationship between the spread of an RRC pulse and its PAPR. Likewise, there exists a proportional relationship between the spread of an RRC pulse and a number of J subcarriers.

In some embodiments, K>=6. In some embodiments, as noted above, K is a multiple of the RB size. In some embodiments, J is an integer multiple of the RB size minus 1. So for an RB size of 12, J may be an integer multiple of 12 minus 1, as J needs to be an odd number. E.g., 11,23, 35,etc.

FIG. 8 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 8, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 8, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 1310a-1310c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 1310a-13101c or both, and (ii) other networks (such as the PSTN 140, the internet 150, and the other networks 160). In addition, some or all of the EDs 1310a-1310c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 1310a-1310c may be multimode devices capable of operation according to multiple radio access technologies, and incorporate multiple transceivers necessary to support such.

FIGS. 9A and 9B illustrate example devices that may implement the methods and teachings according to this disclosure. In particular, FIG. 9A illustrates an example ED 1310, and FIG. 9B illustrates an example base station 170. These components could be used in the communication system 100 or in any other suitable system.

As shown in FIG. 9A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 100. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 150). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9B, the base station 170 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 170. The processing unit 1450 implements various processing operations of the base station 170, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 170. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

It should be appreciated that one or more steps of the embodiment methods provided herein may be performed by corresponding units or modules, according to FIG. 10. For example, a signal may be transmitted by a transmitting unit or a transmitting module. A signal may be received by a receiving unit or a receiving module. A signal may be processed by a processing unit or a processing module. Other steps may be performed by:

A QAM signal processing module that separates complex symbols into real and imaginary components;

A Fourier Transform module;

A pulse shaping module;

An Inverse Fourier Transform module.

The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

While the provided system and method have been described in the context of wireless telecommunications, they can also be used in mmWave, microwave backhaul, NTN in 6G, or even to replace the π/2-BPSK modulation in Rel-15.

Decoupling Transmitter and Receiver Frequency Domain Spectrum Shaping

In the above described embodiment, pulse shaping takes place in the transmitter, and a corresponding operation takes place in the receiver, necessitating the transmitter and receiver to know the pulse shape. The pulse shape in the transmitter is ideally a Nyquist pulse, as this guarantees that there is no inter-symbol interference (ISI). Note that the transmitter pulse shape is said to be a Nyquist pulse when the transmitter pulse, multiplied by a matched filter pulse shape together result in an overall Nyquist Pulse shape. For example an overall pulse shape that is a raise cosine pulse shape, the transmitter pulse would be a root raised pulse, which may also be referred to as a Nyquist pulse shape, when it is transmitter specific, and not the combined effect of transmit and receive pulse shapes.

In addition, J is constrained to be odd. The FDSS coefficients $f_1, f_2, \ldots, f_J$ represent non-zero frequency components of a conjugate symmetrical pulse. Selection of J and the pulse shape represent a tradeoff between PAPR and capacity. In some embodiments, the transmit pulse shape is selected on some other basis, for example, with the objective of minimizing out of band emissions as among a set of transmit pulse shapes for a given value of J and a given transmit constellation or modulation order.

In another embodiment, the pulse shape in the transmitter is not constrained to be a Nyquist pulse. Because of this, different pulse shapes can be used in the transmitter that have better PAPR. In addition, J is not constrained to be odd. It would be expected that the use of Nyquist pulses in the transmitter will break the orthogonality at the receiver, and this affects BLER performance. The loss of BLER performance is expected to be significant for larger constellations such as 16 QAM, 64 QAM or higher. Thus, the use of non-Nyquist and even length Nyquist pulses is not expected to be suitable. However, in these embodiments, further processing is performed in the receiver such that the effect of the possibly non-Nyquist transmitter pulse shape is removed, and to ensure a Nyquist pulse shape prior to conversion to the time domain. In this manner, the benefits of the Nyquist pulse shape, namely no ISI and orthogonality, are preserved thereby avoiding the deleterious effect upon BLER, but a signal with possibly improved PAPR is transmitted over the channel. With this approach, the receiver does not even need to be aware of the pulse shape used in the transmitter. So, the transmitter can adaptively select the pulse shape based on its own priorities, e.g. PAPR, and the receiver can process the signal without requiring any additional overhead to inform the receiver of what pulse shape was used.

The structure of the transmitter for this embodiment is the same as described previously with reference to FIGS. 1 and 2A, except for the following differences:

a. The parameter J satisfies K≤J≤2K for odd K and K+1≤J≤2K for even K.

b. J need not be odd; however, keeping J odd has the benefit of avoiding energy loss in the reshaping process. This is because, although J can be even, the receiver will use an odd value for L as detailed below, which means some signal transmitted on one of the edge subcarriers will be eliminated.

c. The pulse shape may be Nyquist or non-Nyquist. The pulse shape can be chosen at the transmitter, for example to minimize PAPR. Transmitter Nyquist pulses such as RRC (while RRC per se is not Nyquist, the combination of RRC in the transmitter and receiver combine to give the effect of an RC pulse which is Nyquist) with a non-zero shaping factor offer lower PAPR than DFT-s-OFDM, which has a rectangle pulse shape in frequency domain. A rectangular pulse shape is equivalent to an RRC pulse shape with α=0. RRC offers lower PAPR with the increase of pulse shaping factor α.

d. In some embodiments, non-Nyquist transmit pulses such as Gaussian, Welch and Kaiser Pulses are used, these having the capability of further lowering the PAPR. Another example of a non-Nyquist transmit pulse is a raised cosine (RC) pulse, for example one with 0.5≤α≤1. In the FDSS block, as before, $f_1, f_2, \ldots, f_J$ represent all non-zero frequency samples of the pulse. For odd J, FDSS can function as described previously with/without cyclic shifting, and based on one of the two indexing methods describe above.

e. The pulse can be Nyquist or non-Nyquist, however, it should have a bell shape to obtain desired PAPR and BLER performance. If J is odd, then $$f_{\frac{J+1}{2}}$$

should represent the center of the pulse. If J is even, then $$f_{\frac{J}{2}} \text{ and } f_{\frac{J}{2}+1}$$

represent are the closest frequencies to the center.

In some embodiments, the transmitter selects the pulse shape, and/or J. The ability to select J allows the transmitter to support different spectral efficiencies by selecting a variable sized pulse width from K≤J≤2K.

This may be done to minimize PAPR, and/or to satisfy some other objective. The pulse shape and J, for a given constellation/modulation order, effect the PAPR. Different pulse shapes may give the best PAPR for a given value of J and for a given constellation. For example, the Kaiser pulse shape may give the best PAPR for one value of J and a particular constellation, and the Welch pulse shape may give the best PAPR for the same value of J and a different constellation. In some embodiments, the transmitter adaptively switches between pulse shapes and/or value of J based on channel/constellation. In some embodiments, a modulation and coding scheme is adaptively selected, and this determines the constellation, and then a pulse shape and/or value of J are selected based on this. A larger value of J will reduce spectral efficiency thus J can be selected based on a target spectral efficiency vs. PAPR trade-off. The larger the J, the better the PAPR and lower the spectral efficiency.

FIG. 11 is a block diagram of a receiver provided by an embodiment of the disclosure suitable for use with this embodiment. Many features are the same as the receiver of FIG. 4 including: CP remover block 400, serial to parallel converter 402, N-DFT 404, 2K-IDFT block 410, and post-processor 412. These functional blocks perform the inverse of the operations described for the transmitter. Only the relevant J frequency components are taken from the output of the N-DFT 404. Note this is effectively a sub-carrier demapping operation. Optionally, a sub-carrier de-mapper block may be provided at the output of the N-DFT. Note that de-mapping from N to J performed in the receiver corresponds with the mapping of J to N in the transmitter.

FIG. 11 differs from FIG. 4, in that:
a. in place of one tap channel equalizer 406, a channel and transmit pulse-based equalizer 1106 is provided, which is explained in detail below;
b. In place of FDSS block 408 which is based on the transmit pulse shape, Nyquist FDSS block 1108 is provided which is not based on the transmit pulse shape, which is also explained in detail below.

Channel and Transmit Pulse-Based Equalizer

Let $\bar{r}_1, \bar{r}_2, \ldots, \bar{r}_J$ be the input to this block 1106, which correspond to the transmitted pulse shaped signal $d_1, d_2, \ldots, d_J$. The input $r_j$ can be represented as $$\bar{r}_j = \bar{h}_j d_j + n_j = \bar{h}_j f_j s_j + n_j$$

where $\bar{h}_j$ is the channel frequency component for the $j^{th}$ subcarrier, $f_j$ is the corresponding transmit pulse shaping coefficients, and $s_j$ is the signal component.

Considering the transmit pulse shaping coefficient as a part of the channel (transparent approach), the channel and FDSS coefficient product is estimated as $\tilde{h}_j = \bar{h}_j f_j + \varepsilon_j$ where $\varepsilon_j$ is the estimation error. Note this estimation occurs in the receiver without requiring knowledge of the transmit pulse shape. For the purpose of channel estimation, the transmitted signal includes pilots that are subject to the same pulse shaping as the data. Channel estimates performed upon the pilots, without removing the pulse shaping, will incorporate the effect of the actual channel and the transmit pulse shape.

Now, by considering $$\bar{r}_{\lfloor \frac{J}{2} \rfloor + 1}$$

as the center, the equalizer processes L≤J center components and disregards the rest. In here, L is always an odd number. Let these L components be $$r_1, r_2, \ldots, r_L = \bar{r}_{\lfloor \frac{J}{2} \rfloor - \frac{L-1}{2} + 1}, \bar{r}_{\lfloor \frac{J}{2} \rfloor - \frac{L-1}{2} + 2}, \ldots, \bar{r}_{\lfloor \frac{J}{2} \rfloor + 1}, \bar{r}_{\lfloor \frac{J}{2} \rfloor + 2}, \ldots, \bar{r}_{\lfloor \frac{J}{2} \rfloor + \frac{L-1}{2} + 1}.$$

Similarly, considering $$\tilde{h}_{\lfloor \frac{J}{2} \rfloor + 1}$$

as the center, the equalizer keeps L center estimated channels, $$h_1, h_2, \ldots, h_L = \tilde{h}_{\lfloor \frac{J}{2} \rfloor - \frac{L-1}{2} + 1}, \tilde{h}_{\lfloor \frac{J}{2} \rfloor - \frac{L-1}{2} + 2},$$
$$\ldots, \tilde{h}_{\lfloor \frac{J}{2} \rfloor + 1}, \tilde{h}_{\lfloor \frac{J}{2} \rfloor + 2}, \ldots, \tilde{h}_{\lfloor \frac{J}{2} \rfloor + \frac{L-1}{2} + 1}.$$

The L components are centered within the J outputs of sub-carrier mapping. In order that information not be lost, L≥K for odd K and L≥K+1 for even K. The result is that, depending on the value of L, some components at the edge of the set of J outputs are discarded. Due to the use of pulse shaping in the transmitter, typically there is less energy at the edge of the band in any event, so the loss that results from discarding certain components at the edge is not significant.

The channel and transmit pulse-based equalizer 1106 performs one tap equalization for each $r_l$ $\forall l \in \{1, L\}$ as follows $$q_l = \frac{h_l r_l}{|h_l|^2 + \sigma^2}.$$

where $\sigma^2$ is noise variance. Then, $q_1, q_2, \ldots, q_L$ are passed on to the Nyquist FDSS 1108.

The effect of the equalization is to recover an estimate of the signal components $s_l$ in the frequency domain. At this point, the effect of the transmit pulse shape has been removed.

Nyquist FDSS

The input to the Nyquist FDSS block 1108 is a set of estimates of signal components $s_l$ in the frequency domain. Performing 2K-IDFT on these signal components directly would result in non-orthogonality/self interference because no Nyquist pulse shape has been applied (or it can be viewed that a square pulse shape exists, which is not a Nyquist pulse shape).

In order to address this, the Nyquist FDSS operation is performed in the receiver and creates real domain orthogonality, irrespective of the pulse shape used in the transmitter. The operation of this block is shown in FIG. 12. In FIG. 12, $p_1, p_2, \ldots, p_L$ are all non-zero frequency samples of the receiver pulse. The receiver pulse has the following characteristics:

The receiver pulse must be a Nyquist pulse.
The receiver pulse should be a frequency domain real pulse, thus, $p_1, p_2, \ldots, p_L$ are real symmetrical around the center $$p_{\frac{L+1}{2}}.$$

This implies that $$p_{\frac{L+1}{2}}$$

is the center frequency of the pulse and L is always an odd number.

$u_1, u_2, \ldots, u_L$ are the outputs of the Nyquist FDSS operation.

FIG. 13 shows an example of the interplay between J, which is the transmit pulse width which is the number of information symbols, and L which is the pulse width of the Nyquist pulse in the receiver. In this example, J=36, K=18, and L=27 which satisfy the constraints on L and K set out previously:

L≥K for odd K and L≥K+1 for even K.
L odd;
K≤J≤2K for odd K and it is K+1≤J≤2K for even K.

2K-IDFT

The input to the 2K-IDFT 410 is $u_1, u_2, \ldots, u_L$. The system adds (2K−L+1)/2 zeros to the left $u_1$ and (2K−L−1)/2 zeros to the right of $u_L$ to form a 2K vector. Then the 2K-IDFT 410 processes the 2K vector to produce an output $\tilde{a}_1 + i\ddot{a}_1, \ddot{b}_1 + i\tilde{b}_1, \tilde{a}_2 + i\ddot{a}_2, \ddot{b}_2 + i\tilde{b}_2, \ldots, \tilde{a}_K + i\ddot{a}_K, \ddot{b}_K + i\tilde{b}_K$. As before, $i\ddot{a}_k$ is the imaginary interference to real signal $\tilde{a}_k$ and similarly $\ddot{b}_k$ is real interference to imaginary signal $i\tilde{b}_k$. The output of the 2K-IDFT can be processed as in the previously described embodiment (described with reference to FIG. 4).

Advantageously, with this embodiment, the transmitter is able to pick both Nyquist or non-Nyquist pulses that minimize PAPR. The transmitter may support range of pulse lengths, thus providing spectral efficiency vs PAPR tradeoff. The receiver does not need to know the transmitter pulse shape; therefore, transmitter has the flexibility to use different types of pulses. The provided receiver avoids self-interference, thus, there is no loss of performance for different pulse shapes used as transmitter pulses, including non-Nyquist pulses and even length pulses. The embodiment provides the ability to use any QAM constellation order without losing BLER performance.

The receiver is able to shorten (prune) the pulse width (thus lower spectral usage) to support more users, and yet keep the real domain orthogonality. This allows an increase the bandwidth efficiency and supports more users in a multiple access channel. This is because the transmitter pulse width is J but the receiver only uses L≤J sub-bands to recover. That means it is not important to the receiver what is in extra J−L subbands. Because of this transmissions for a different receiver can be allowed to overlap these sub-bands without detrimental effect.

The robustness to carrier frequency offset (CFO) is improved as the receiver can use a pruned pulse shape without introducing self-interference. Typically, it is possible that channel conditions may introduce a carrier frequency offset. Now consider there are two UEs with neighbouring sub-bands. Due to CFO, one UE may leak some energy to the other UE. This energy leakage is mostly in the edges of J sub-bands of two UEs. However, as only center L out of the J sub-bands are processed, this effect can be substantially removed.

Signaling

The value of J indicates the number of allocated sub-carriers for a given receiver. In some embodiments, J is signaled to the receiver, for example as part of an allocated bandwidth section of the signaling. In some embodiments, K is also included in signaling sent to the receiver. In some embodiments, K is included in signaling, but limited to a set of possible values of K, such that an index to one of the values can be efficiently signaled. In another embodiment, a ratio K/J is transmitted instead of K. The ratio K/J determines the PAPR vs. spectral efficiency tradeoff.

In some embodiments, the K/J ratio is limited to a set of possible values to save signaling overhead. An index of a value in the set can be transmitted instead of the value per se. One example is to quantize K/J into {0.5, 0.65, 0.8, 1}. Other resolutions and/or quantizations are also possible. In some embodiments, the set of possible values is such that PAPR is reduced by a similar value with each step of K/J decrease. The allocated sub-bands J may have a range of values, and therefore, the corresponding K can have range of values. However, by signaling K/J and quantizing it to only few values, this can reduce signaling overhead.

Detailed Signaling Example

There are two key parameters: number of QAM symbols denoted by K and allocated subcarriers J. Typically K≤J≤2K−1. Based on these two parameters, a new signaling approach is provided that can co-exist with the NR frame structure specified in 3GPP specification.

First, a new parameter β is defined, referred to herein as stretching factor which is related to pulse shape. The stretching factor β takes values from 0.5≤β≤1. The parameter β provides PAPR vs spectral efficiency tradeoff. Two further parameters are $\bar{J}$ which is the number of allocated resource blocks (RBs) for the transmitter and $\bar{K}$ which is the number of RBs carrying information such that $\bar{K}<\bar{J}$. One can visualize $\bar{J}$ as allocated bandwidth in terms of RBs and $\bar{K}$ as RBs carrying useful signal.

The transmitter needs to know two parameters:
the number of RBs $\bar{K}$ for data; and
stretching factor β.

These two parameters are transmitted through the signaling for uplink transmission. The selection of the parameter β is based on desired spectral efficiency and PAPR, which is detailed further below. Based on these parameters, the transmitter finds the RB allocation:

$$\bar{J} = \max\left\{\bar{K}+1, \left\lfloor \frac{\bar{K}}{\beta} \right\rceil \right\} \quad \text{eq. 1}$$

where ⌊ ⌉ denotes rounding to the nearest integer. As 0.5≤β≤1, we have $\bar{K}+1 \leq \bar{J} \leq 2\bar{K}$. As β can take range values, $\bar{J}$ can take integer values of $\bar{K}+1, \ldots, 2\bar{K}$.

As mentioned the transmitter is given the knowledge of $\bar{K}$ and β. Then it finds the respective $\bar{J}$ using eq. 1. In order to carry out the FDSS operation, the transmitter needs to know the K and J parameters. It finds these parameters in the following way.

First, let m be the number of sub-carriers for one RB. In the current 3GPP standards m=12. Then it finds K and J as:

$$K = m\overline{K} \quad \text{eq. 2}$$

$$J = m\overline{J} - 1 \quad \text{eq. 3}$$

Note that other values K+1≤J≤mJ are also possible but not generally recommended.

In the above β can take a range of values, however, this may not be feasible as signaling overhead may increase. Thus, in some embodiments α is limited to a few values. For example β may be limited to take on one of V discrete values, i.e., $\uparrow \in \{1_1, 1_2, \ldots, 1_V\}$. In this case, the $\overline{J}$ is limited to V values.

In some embodiments, $\{1_1, 1_2, \ldots, 1_V\}$ are optimized to satisfy V different spectral efficiencies and PAPR requirement.

Based on simulation results V=4 levels has been found to provide an acceptable resolution, such that signaling overhead is limited to two bits to identify V=4 levels. These values are:

β∈{0.5, 0.66, 0.83, 1}

In the approximate sense, β is proportional to spectral efficiency factor. It is observed that PAPR is a roughly linear function of β. Thus, the β∈{0.5,0.66,0.83,1} is a good choice. This behavior is shown in the FIG. 14.

Based on β∈{0.5, 0.66, 0.83, 1}, the following table shows the values of $\overline{J}$ for different $\overline{K}$.

| $\overline{K}$ | $\overline{J}$ for β = 1 | $\overline{J}$ for β = 0.83 | $\overline{J}$ for β = 0.66 | $\overline{J}$ for β = 0.5 |
|---|---|---|---|---|
| 1 | 2 | 2 | 2 | 2 |
| 2 | 3 | 3 | 3 | 4 |
| 3 | 4 | 4 | 5 | 6 |
| 4 | 5 | 5 | 6 | 8 |
| 5 | 6 | 6 | 8 | 10 |
| 6 | 7 | 7 | 9 | 12 |
| 7 | 8 | 8 | 11 | 14 |
| 8 | 9 | 10 | 12 | 16 |
| 9 | 10 | 11 | 14 | 18 |
| 10 | 11 | 12 | 15 | 20 |
| 11 | 12 | 13 | 17 | 22 |
| 12 | 13 | 14 | 18 | 24 |
| 13 | 14 | 16 | 20 | 26 |
| 14 | 15 | 17 | 21 | 28 |
| 15 | 16 | 18 | 23 | 30 |
| 16 | 17 | 19 | 24 | 32 |
| 17 | 18 | 20 | 26 | 34 |
| 18 | 19 | 22 | 27 | 36 |
| 19 | 20 | 23 | 29 | 38 |
| 20 | 21 | 24 | 30 | 40 |
| 21 | 22 | 25 | 32 | 42 |
| 22 | 23 | 27 | 33 | 44 |
| 23 | 24 | 28 | 35 | 46 |
| 24 | 25 | 29 | 36 | 48 |
| 25 | 26 | 30 | 38 | 50 |
| 26 | 27 | 31 | 39 | 52 |
| 27 | 28 | 33 | 41 | 54 |
| 28 | 29 | 34 | 42 | 56 |
| 29 | 30 | 35 | 44 | 58 |
| 30 | 31 | 36 | 45 | 60 |
| 31 | 32 | 37 | 47 | 62 |
| 32 | 33 | 39 | 48 | 64 |
| 33 | 34 | 40 | 50 | 66 |
| 34 | 35 | 41 | 52 | 68 |
| 35 | 36 | 42 | 53 | 70 |
| 36 | 37 | 43 | 55 | 72 |
| 37 | 38 | 45 | 56 | 74 |
| 38 | 39 | 46 | 58 | 76 |
| 39 | 40 | 47 | 59 | 78 |
| 40 | 41 | 48 | 61 | 80 |
| 41 | 42 | 49 | 62 | 82 |
| 42 | 43 | 51 | 64 | 84 |
| 43 | 44 | 52 | 65 | 86 |
| 44 | 45 | 53 | 67 | 88 |
| 45 | 46 | 54 | 68 | 90 |
| 46 | 47 | 55 | 70 | 92 |
| 47 | 48 | 57 | 71 | 94 |
| 48 | 49 | 58 | 73 | 96 |

Numerical Results

Various further numerical results are shown in FIGS. 15, 16 and 17.

FIG. 15 shows an example of PAPR performance for 64 QAM. It is observed that the Kaiser pulse shape has the lowest PAPR. As mentioned previously, the best pulse shape may be different for different constellation.

FIG. 16 shows an example of BLER performance using the provided approach. For completeness, FIG. 16 includes performance results where the receiver pulse width L is even. It is observed that the provided approach yields good BLER performance. It can also be seen that in cases where the transmitter pulse width is even and the receiver pulse width is not odd, performance degrades. This can be seen by comparing the $2^{nd}$ and $3^{rd}$ curves in the legend. Both cases uses the same even transmit pulse width, however, at the receiver, the $2^{nd}$ curve is for an odd receive pulse width, which is significantly better than $3^{rd}$ curve, which uses the same even transmitter pulse width.

FIG. 17 shows an example of the performance for L≤J by choosing different values of RRC parameter, noting that the lower the β, the smaller the L. Results are also included for where the receive frequency domain samples are pruned instead of using a Nyquist pulse, referred to as "Trunc", for truncation, in FIG. 17. It is observed that there is an SNR shift in the performance with the decrease of L. However, note that the decrease of L means saving spectral occupancy. Pruning the pulse instead of using a Nyquist pulse is a trivial alternative approach. From FIG. 17 it is observed that pruning the pulse instead of using a Nyquist pulse results in an error floor, unlike the provided approach.

It is noted that as in the previously described embodiment, the above described embodiment is applicable for the two situations where the Fourier Transform outputs are cyclically shifted, and where the Fourier Transform outputs are not cyclically shifted.

Numerous modifications and variations of the present disclosure are possible in light of the above teachings. It is therefore to be understood that within the scope of the appended claims, the disclosure may be practiced otherwise than as specifically described herein.

The invention claimed is:

1. A communication method comprising:
   producing a set of 2K outputs that include K real components and K imaginary components from K complex symbols;
   performing a Fourier transform operation on the 2K outputs to produce 2K Fourier transform outputs;
   pulse shaping the 2K Fourier transform outputs by multiplying each of J of the 2K Fourier transform outputs with a respective one of J non-zero coefficients, wherein the J non-zero coefficients represent a frequency response of a transmit pulse shape of a set of transmit pulse shapes, to produce J pulse shaped outputs, where K≤J<2K for odd K, and K+1≤J<2K for even K;
   performing an inverse Fourier transform operation on the J pulse shaped outputs to produce an inverse Fourier transform output;
   outputting the inverse Fourier transform output; and transmitting signalling conveying J and K; wherein the signaling comprises an index of a value of J from within a set of possible values; or an index of a value of K/J from within a set of possible values of K/J.

2. The method of claim 1 further comprising
selecting the transmit pulse shape from the set of transmit pulse shapes, wherein the set of transmit pulse shapes includes at least one non-Nyquist pulse shape.

3. The method of claim 1 further comprising:
selecting a value of J based on a target spectral efficiency vs. peak average power ratio (PAPR) trade-off.

4. The method of claim 2 further comprising:
selecting the transmit pulse shape with the objective of minimizing peak average power ratio (PAPR) as among the set of transmit pulse shapes for a given value of J and a given transmit constellation or modulation order.

5. The method of claim 2, further comprising selecting the transmit pulse shape with the objective of minimizing out of band emissions as among the set of transmit pulse shapes for a given value of J and a given transmit constellation or modulation order.

6. The method of claim 4 wherein the set of transmit pulse shapes includes:
raised root cosine (RRC), raised cosine (RC), Gaussian, Welch and Kaiser pulse shapes.

7. An apparatus comprising:
a processor and memory configured to perform the following steps:
producing a set of 2K outputs that include K real components and K imaginary components from K complex symbols;
performing a Fourier transform operation on the 2K outputs to produce 2K Fourier transform outputs;
pulse shaping the 2K Fourier transform outputs by multiplying each of J of the 2K Fourier transform outputs with a respective one of J non-zero coefficients, wherein the J non-zero coefficients represent a frequency response of a transmit pulse shape of a set of transmit pulse shapes, to produce J pulse shaped outputs, where $K \leq J < 2K$ for odd K, and $K+1 \leq J < 2K$ for even K;
performing an inverse Fourier transform operation on the J pulse shaped outputs to produce an inverse Fourier transform output;
outputting the inverse Fourier transform output; and
transmitting signalling conveying J and K; wherein the signaling comprises an index of a value of J from within a set of possible values; or an index of a value of K/J from within a set of possible values of K/J.

8. The apparatus of claim 7 wherein the processor and memory configured to select the transmit pulse shape from the set of transmit pulse shapes, wherein the set of transmit pulse shapes includes at least one non-Nyquist pulse shape.

9. The apparatus of claim 7 wherein the processor and memory are further configured to perform the following:
selecting a value of J based on a target spectral efficiency vs. PAPR trade-off.

10. The apparatus of claim 7 wherein the processor and memory are further configured to select the transmit pulse shape with the objective of minimizing peak average power ratio (PAPR) as among the set of transmit pulse shapes for a given value of J and a given transmit constellation or modulation order.

11. The apparatus of claim 7 wherein the processor and memory are further configured to selects the transmit pulse shape with the objective of minimizing out of band emissions as among the set of transmit pulse shapes for a given value of J and a given transmit constellation or modulation order.

12. The apparatus of claim 7 wherein the set of transmit pulse shapes includes:
raised root cosine (RRC), raised cosine (RC), Gaussian, Welch and Kaiser pulse shapes.

* * * * *

UNITED STATES PATENT AND TRADEMARK OFFICE
CERTIFICATE OF CORRECTION

PATENT NO. : 11,108,607 B2  
APPLICATION NO. : 16/585553  
DATED : August 31, 2021  
INVENTOR(S) : Nuwan Suresh Ferdinand et al.

Page 1 of 1

It is certified that error appears in the above-identified patent and that said Letters Patent is hereby corrected as shown below:

In the Claims

At Column 23, Line 5, Claim 2:
"The method of Claim 1 further comprising" should be -- The method of Claim 1 further comprising: --

Signed and Sealed this
Seventh Day of June, 2022

Katherine Kelly Vidal
*Director of the United States Patent and Trademark Office*